US012767070B2

(12) United States Patent
Mishima et al.

(10) Patent No.: US 12,767,070 B2
(45) Date of Patent: Oct. 20, 2026

(54) SIGNAL TRANSMISSION DEVICE, ELECTRONIC APPARATUS, AND VEHICLE

(71) Applicant: ROHM CO., LTD., Kyoto (JP)

(72) Inventors: Koki Mishima, Kyoto (JP); Daiki Yanagishima, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 10 days.

(21) Appl. No.: 19/090,743

(22) Filed: Mar. 26, 2025

(65) Prior Publication Data

US 2025/0303985 A1 Oct. 2, 2025

(30) Foreign Application Priority Data

Apr. 1, 2024 (JP) ................................ 2024-058916

(51) Int. Cl.
*B60R 16/023* (2006.01)

(52) U.S. Cl.
CPC ................................ *B60R 16/023* (2013.01)

(58) Field of Classification Search
CPC ................................................ B60R 16/023
USPC ...................................................... 375/258
See application file for complete search history.

(56) References Cited

U.S. PATENT DOCUMENTS 12,034,437 B2 7/2024 Kikuchi et al.
2018/0205319 A1* 7/2018 Zhuo ................. H02M 3/33523
2023/0070930 A1* 3/2023 Gu ...................... H02M 1/4233
2023/0327662 A1 10/2023 Kikuchi et al.
2024/0322816 A1 9/2024 Kikuchi et al.

FOREIGN PATENT DOCUMENTS

JP 2012134686 A 7/2012
WO 2022070944 A1 4/2022

* cited by examiner

*Primary Examiner* — Fitwi Y Hailegiorgis
(74) *Attorney, Agent, or Firm* — CANTOR COLBURN LLP

(57) ABSTRACT

A signal transmission device includes a first logic, a second logic, a plurality of isolation devices configured to isolate and transmit a plurality of sets of first signals and second signals between the first logic and the second logic, and a plurality of output circuits configured to generate a plurality of output signals according to instructions from the second logic. The first logic is capable of simultaneously transmitting a plurality of combinations of signals from different sets among the plurality of sets of the first signals and the second signals. The second logic performs operations according to the combination of signals received via the plurality of isolation devices from among the plurality of sets of the first signals and the second signals.

10 Claims, 18 Drawing Sheets

FIG.12

| 1st | 2nd | output |
|---|---|---|
| ON1A | − | OUT1=H,OUT2=Hi−Z |
| OFF1A | − | OUT1=L,OUT2=Hi−Z |
| ON2A | − | OUT1=Hi−Z,OUT2=H |
| OFF2A | − | OUT1=Hi−Z,OUT2=L |
| ON1A | OFF1A | CMTI canceling |
| ON2A | OFF2A | CMTI canceling |

FIG.16

| 1st | 2nd | output |
|---|---|---|
| ON1A | – | OUT1=H,OUT2=Hi-Z |
| OFF1A | – | OUT1=L,OUT2=Hi-Z |
| ON2A | – | OUT1=Hi-Z,OUT2=H |
| OFF2A | – | OUT1=Hi-Z,OUT2=L |
| ON1A | OFF1A | CMTI canceling |
| ON2A | OFF2A | CMTI canceling |
| ON1A | ON2A | OUT1=H,OUT2=H |
| OFF1A | OFF2A | OUT1=L,OUT2=L |
| ON1A | OFF2A | SPI MODE |
| ON2A | OFF1A | – |

SIGNAL TRANSMISSION DEVICE, ELECTRONIC APPARATUS, AND VEHICLE

CROSS-REFERENCE TO RELATED APPLICATIONS

The present invention claims priority under 35 U.S.C. § 119 Japanese Patent Application No. 2024-058916, filed Apr. 1, 2024, the entire content of which is incorporated herein by reference.

BACKGROUND OF THE INVENTION

1. Technical Field

The present disclosure relates to a signal transmission device, an electronic apparatus, and a vehicle.

2. Description of Related Art

Conventionally, signal transmission devices that electrically isolate between a primary circuit system and a secondary circuit system while transmitting signals between the primary circuit system and the secondary circuit system are used in various applications (such as power supply devices or motor driving devices).

As examples of related conventional technology, Patent Document 1 (International Publication No. WO 2022/070944) and Patent Document 2 (Japanese Patent Application Publication No. 2012-134686) by the present applicant can be cited.

BRIEF DESCRIPTION OF DRAWINGS

FIG. 12 is a diagram showing an example of output control in the first embodiment.

FIG. 16 is a diagram showing an example of output control in the second embodiment.

DETAILED DESCRIPTION

<Signal Transmission Device (Basic Configuration)>

Figure 1:
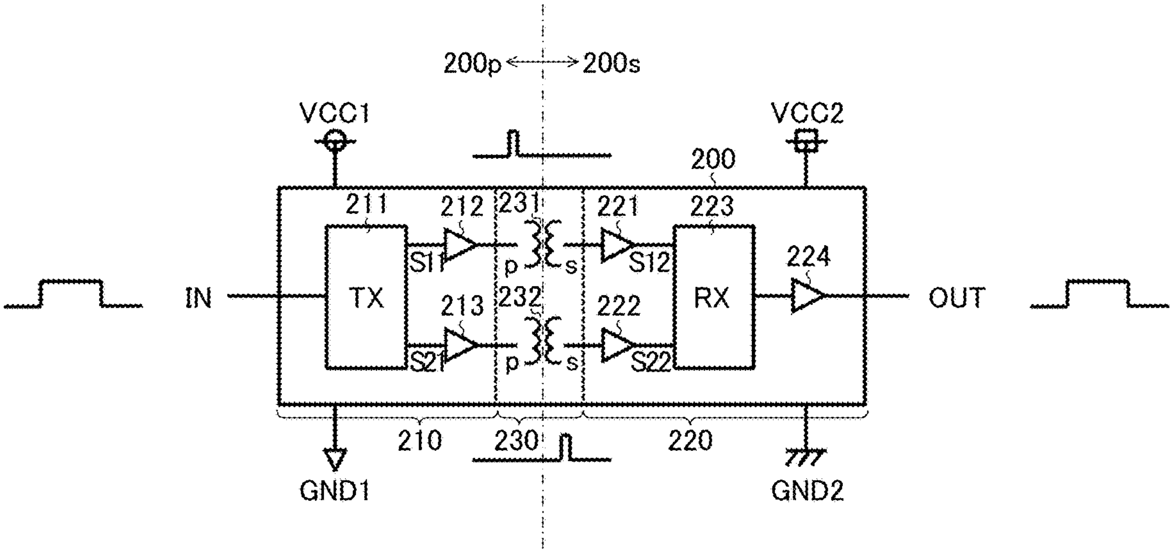
FIG. 1 is a diagram illustrating the basic configuration of a signal transmission device.

FIG. 1 is a diagram illustrating the basic configuration of a signal transmission device. The signal transmission device 200 of this configuration example is a semiconductor integrated circuit device (what is generally called an isolated gate driver IC) that, while isolating between a primary circuit system 200*p* (VCC1-GND1 system) and a secondary circuit system 200*s* (VCC2-GND2 system), transmits a pulse signal from the primary circuit system 200*p* to the secondary circuit system 200*s* to drive the gate of a switching device (unillustrated) provided in the secondary circuit system 200*s*. The signal transmission device 200 has, for example, a controller chip 210, a driver chip 220, and a transformer chip 230 sealed in a single package.

The controller chip 210 is a semiconductor chip that operates by being supplied with a supply voltage VCC1 (e.g., seven volts at the maximum with respect to GND1). The controller chip 210 has, for example, a pulse transmission circuit 211 and buffers 212 and 213 integrated in it.

The pulse transmission circuit 211 is a pulse generator that generates transmission pulse signals S11 and S21 according to an input pulse signal IN. More specifically, when indicating that the input pulse signal IN is at high level, the pulse transmission circuit 211 pulse-drives (outputs a single or a plurality of pulses in) the transmission pulse signal S11; when indicating that the input pulse signal IN is at low level, the pulse transmission circuit 211 pulse-drives the transmission pulse signal S21. That is, the pulse transmission circuit 211 pulse-drives either the transmission pulse signal S11 or S21 according to the logic level of the input pulse signal IN.

The buffer 212 receives the transmission pulse signal S11 from the pulse transmission circuit 211, and pulse-drives the transformer chip 230 (more specifically, a transformer 231).

The buffer 213 receives the transmission pulse signal S21 from the pulse transmission circuit 211, and pulse-drives the transformer chip 230 (more specifically, a transformer 232).

The driver chip 220 is a semiconductor chip that operates by being supplied with a supply voltage VCC2 (e.g., 30 volts at the maximum with respect to GND2). The driver chip 220 has, for example, buffers 221 and 222, a pulse reception circuit 223, and a driver 224 integrated in it.

The buffer 221 performs waveform shaping on a reception pulse signal S12 induced in the transformer chip 230 (specifically, the transformer 231), and outputs the result to the pulse reception circuit 223.

The buffer 222 performs waveform shaping on a reception pulse signal S22 induced in the transformer chip 230 (specifically, the transformer 232), and outputs the result to the pulse reception circuit 223.

According to the reception pulse signals S12 and S22 fed to it via the buffers 221 and 222, the pulse reception circuit 223 drives the driver 224 to generate an output pulse signal OUT. More specifically, the pulse reception circuit 223 drives the driver 224 to raise the output pulse signal OUT to high level in response to the reception pulse signal S12 being pulse-driven and to drop the output pulse signal OUT to low level in response to the reception pulse signal S22 being pulse-driven. That is, the pulse reception circuit 223 switches the logic level of the output pulse signal OUT according to the logic level of the input pulse signal IN. As the pulse reception circuit 223, for example, an RS flip-flop can be suitably used.

The driver 224 generates the output pulse signal OUT under the driving and control of the pulse reception circuit 223.

The transformer chip 230, while isolating between the controller chip 210 and the driver chip 220 on a direct-current basis using the transformers 231 and 232, outputs the transmission pulse signals S11 and S21 fed to the transformer chip 230 from the pulse transmission circuit 211 to, as the reception pulse signals S12 and S22, the pulse reception circuit 223. In the present description, "isolating on a direct-current basis" means leaving two elements to be isolated from each other unconnected by a conductor.

More specifically, the transformer 231 outputs, according to the transmission pulse signal S11 fed to the primary coil 231*p*, the reception pulse signal S12 from the secondary coil 231*s*. Likewise, the transformer 232 outputs, according to the transmission pulse signal S21 fed to the primary coil 232*p*, the reception pulse signal S22 from the secondary coil 232*s*.

In this way, owing to the characteristics of spiral coils used in isolated communication, the input pulse signal IN is split into two transmission pulse signals S11 and S21 (corresponding to a rise signal and a fall signal) to be transmitted via the two transformers 231 and 232 from the primary circuit system 200*p* to the secondary circuit system 200*s*.

Note that the signal transmission device 200 of this configuration example has, separately from the controller chip 210 and the driver chip 220, the transformer chip 230 that incorporates the transformers 231 and 232 alone, and those three chips are sealed in a single package.

With this configuration, the controller chip 210 and the driver chip 220 can each be formed by a common low to middle-withstand-voltage process (with a withstand voltage of several volts to several tens of volts). This eliminates the need for a dedicated high-withstand-voltage process (with a withstand voltage of several kilovolts) and helps reduce manufacturing costs.

The signal transmission device 200 can be employed suitably, for example, in a power supply device or motor driving device in a vehicle-mounted device incorporated in a vehicle. Such a vehicle can be an engine vehicle or an electric vehicle (an xEV such as a BEV [battery electric vehicle], HEV [hybrid electric vehicle], PHEV/PHV [plug-in hybrid electric vehicle/plug-in hybrid vehicle], or FCEV/FCV [fuel cell electric vehicle/fuel cell vehicle]).

<Transformer Chip (Basic Structure)>

Figure 2:
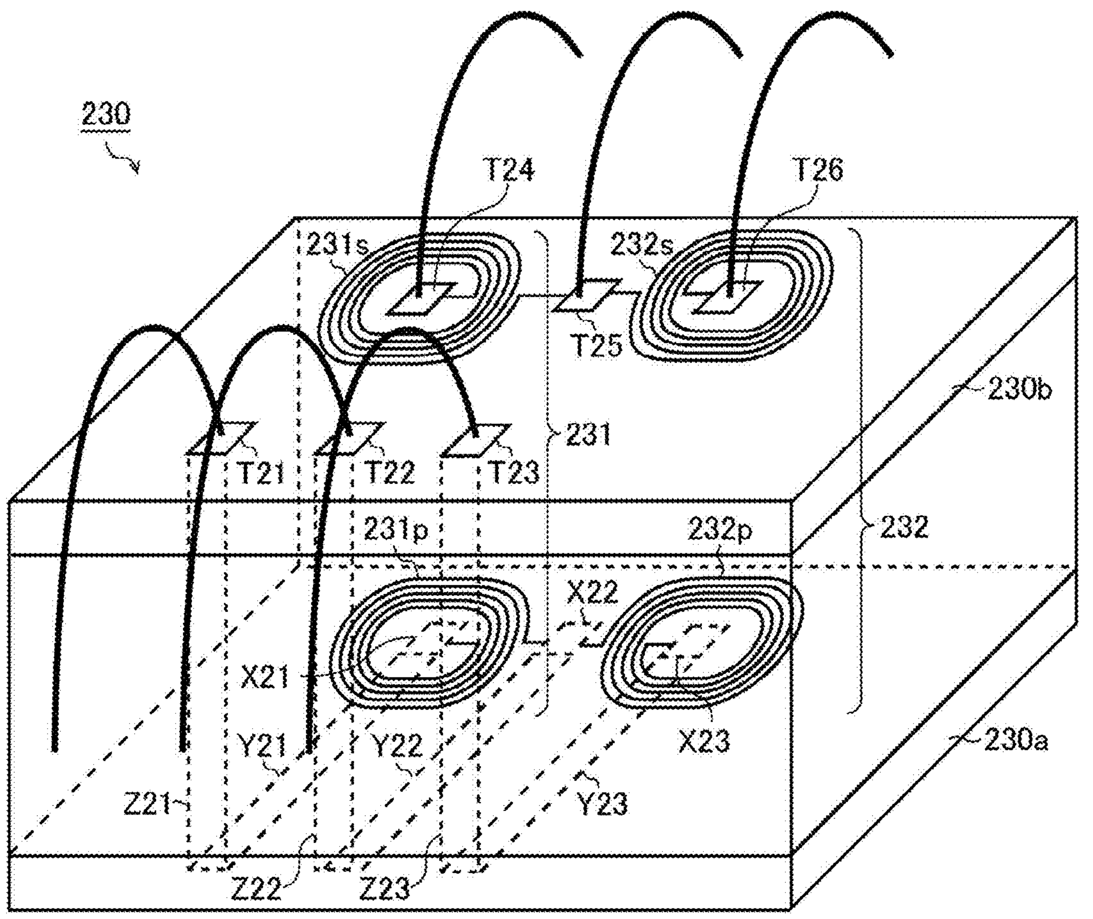
FIG. 2 is a diagram illustrating the basic structure of a transformer chip.

Next, the basic structure of the transformer chip 230 will be described. FIG. 2 is a diagram showing the basic structure of the transformer chip 230. In the transformer chip 230 shown there, the transformer 231 includes a primary coil 231*p* and a secondary coil 231*s* that face each other in the up-down direction; the transformer 232 includes a primary coil 232*p* and a secondary coil 232*s* that face each other in the up-down direction.

The primary coils 231*p* and 232*p* are both formed in a first wiring layer (lower layer) 230*a* in the transformer chip 230. The secondary coils 231*s* and 232*s* are both formed in a second wiring layer (the upper layer in the diagram) 230*b* in the transformer chip 230. The secondary coil 231*s* is disposed right above the primary coil 231*p* and faces the primary coil 231*p*; the secondary coil 232*s* is disposed right above the primary coil 232*p* and faces the primary coil 232*p*.

The primary coil 231*p* is laid in a spiral shape so as to encircle an internal terminal X21 clockwise, starting at the first terminal of the primary coil 231*p*, which is connected to the internal terminal X21. The second terminal of the primary coil 231*p*, which corresponds to its end point, is connected to an internal terminal X22. Likewise, the primary coil 232*p* is laid in a spiral shape so as to encircle an internal terminal X23 anticlockwise, starting at the first terminal of the primary coil 232*p*, which is connected to the internal terminal X23. The second terminal of the primary coil 232*p*, which corresponds to its end point, is connected to the internal terminal X22. The internal terminals X21, X22, and X23 are arrayed on a straight line in the illustrated order.

The internal terminal X21 is connected, via a wiring Y21 and a via Z21 both conductive, to an external terminal T21 in the second layer 230*b*. The internal terminal X22 is connected, via a wiring Y22 and a via Z22 both conductive, to an external terminal T22 in the second layer 230*b*. The internal terminal X23 is connected, via a wiring Y23 and a via Z23 both conductive, to an external terminal T23 in the second layer 230*b*. The external terminals T21 to T23 are disposed in a straight row and are used for wire-bonding with the controller chip 210.

The secondary coil 231*s* is laid in a spiral shape so as to encircle an external terminal T24 anticlockwise, starting at the first terminal of the secondary coil 231*s*, which is connected to the external terminal T24. The second terminal of the secondary coil 231*s*, which corresponds to its end point, is connected to an external terminal T25. Likewise, the secondary coil 232*s* is laid in a spiral shape so as to encircle an external terminal T26 clockwise, starting at the first terminal of the secondary coil 232*s*, which is connected to the external terminal T26. The second terminal of the secondary coil 232*s*, which corresponds to its end point, is connected to the external terminal T25. The external terminals T24, T25, and T26 are disposed in a straight row in the illustrated order and are used for wire-bonding with the driver chip 220.

The secondary coils 231*s* and 232*s* are AC-connected to the primary coils 231*p* and 232*p*, respectively, by magnetic coupling, and are DC-isolated from the primary coils 231*p* and 232*p*. That is, the driver chip 220 is AC-connected to the controller chip 210 via the transformer chip 230 and is DC-isolated from the controller chip 210 by the transformer chip 230.

<Transformer Chip (Two-Channel Type)>

Figure 3:
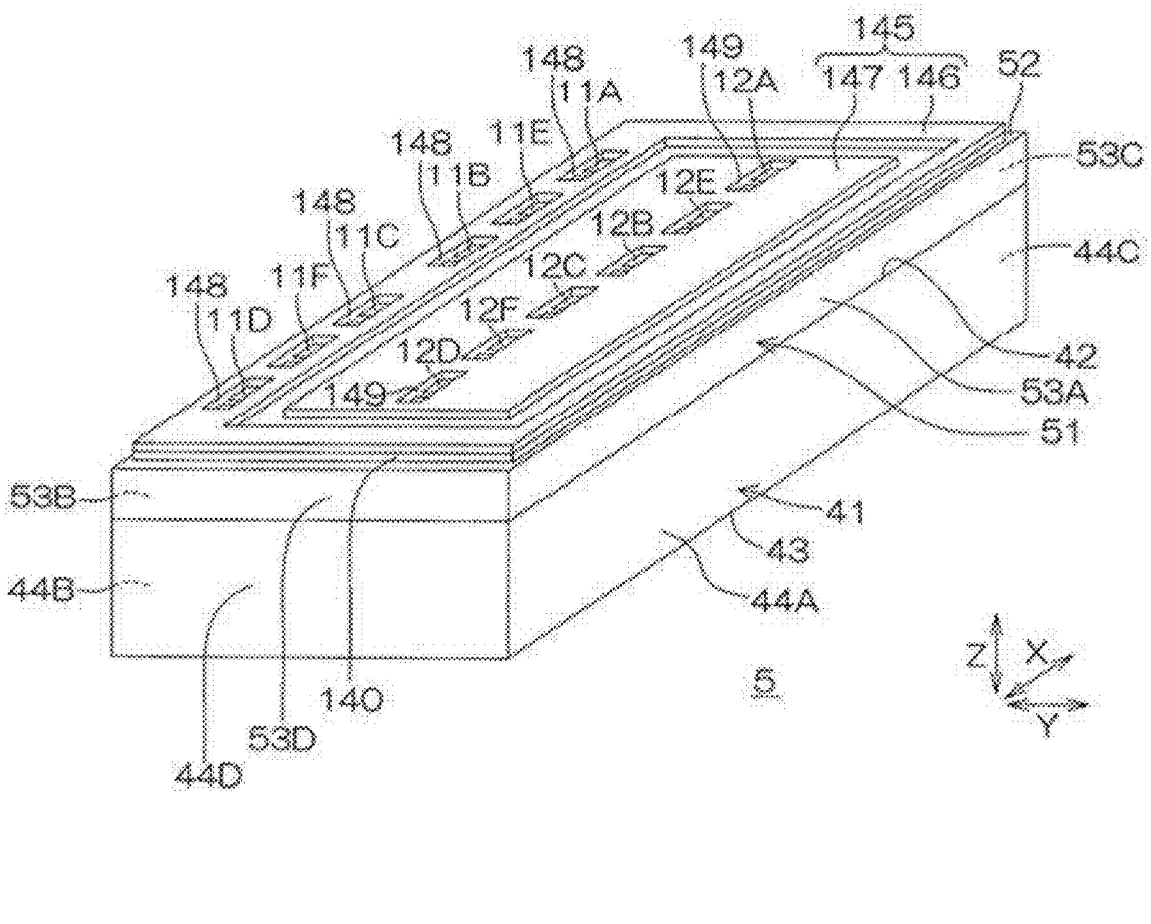
FIG. 3 is a perspective view of a semiconductor device used as a two-channel transformer chip.
Figure 4:
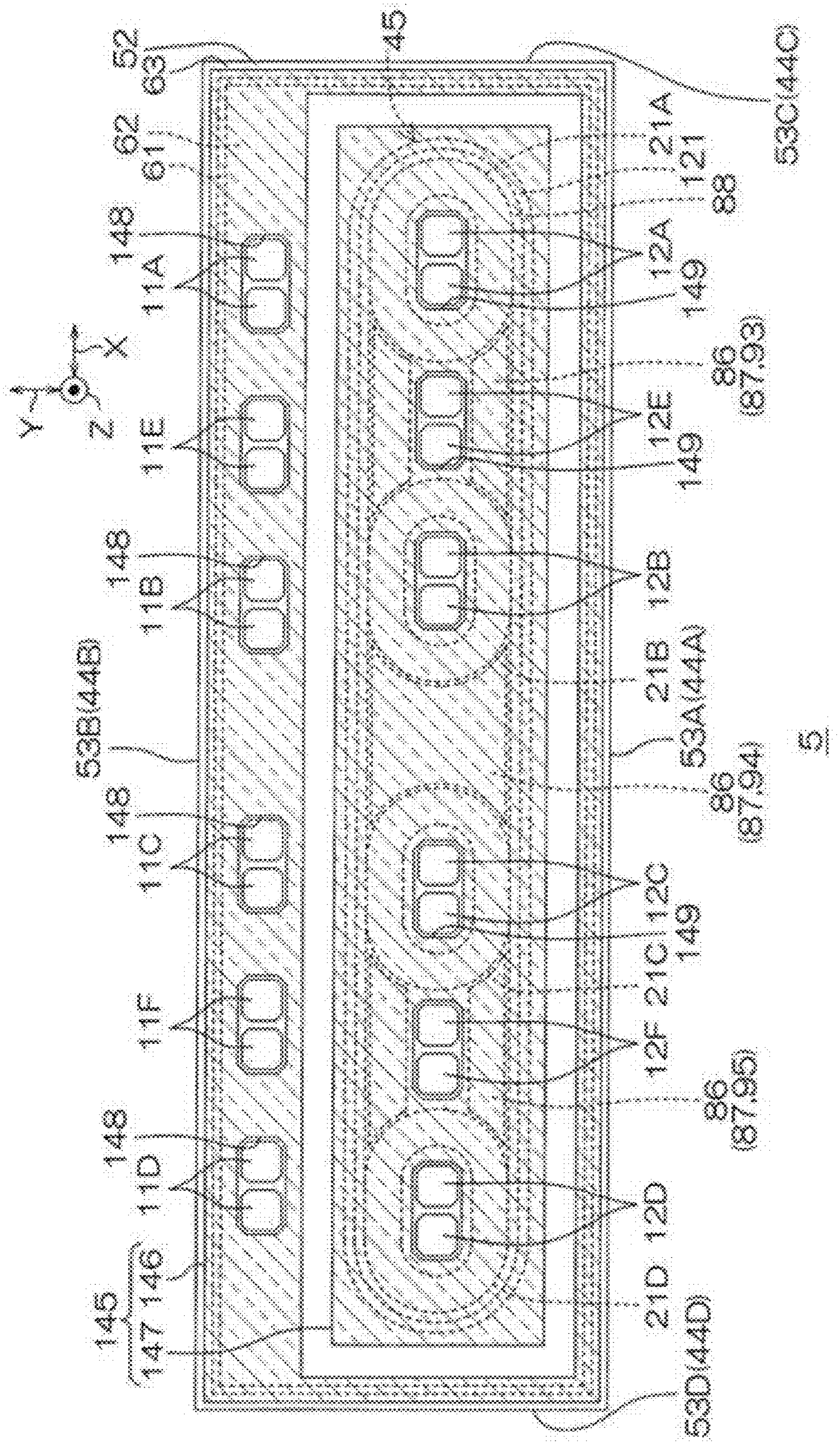
FIG. 4 is a plan view of the semiconductor device shown in FIG. 3.
Figure 5:
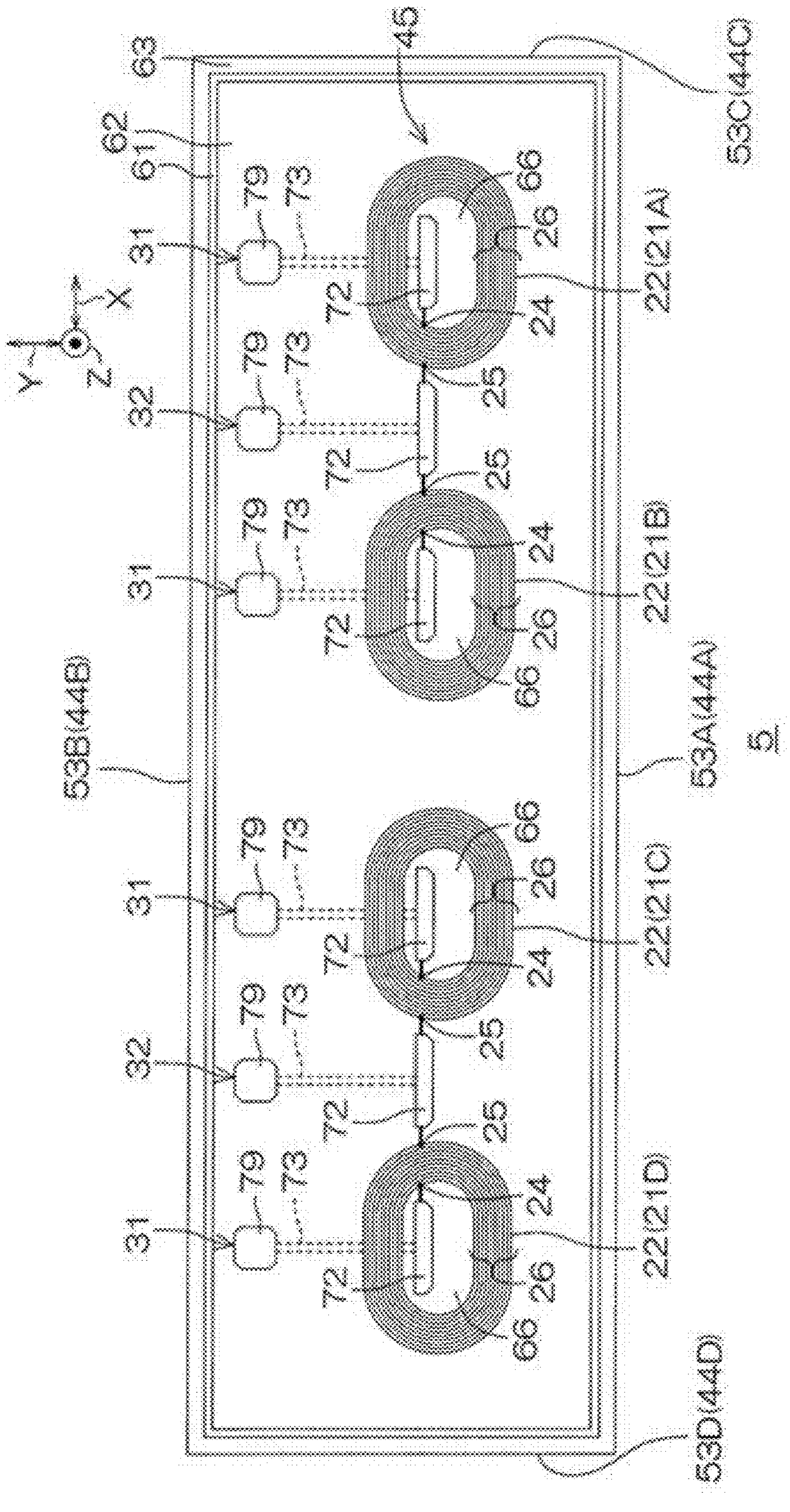
FIG. 5 is a plan view of a layer in the semiconductor device shown in FIG. 3 where low-potential coils are formed.
Figure 6:
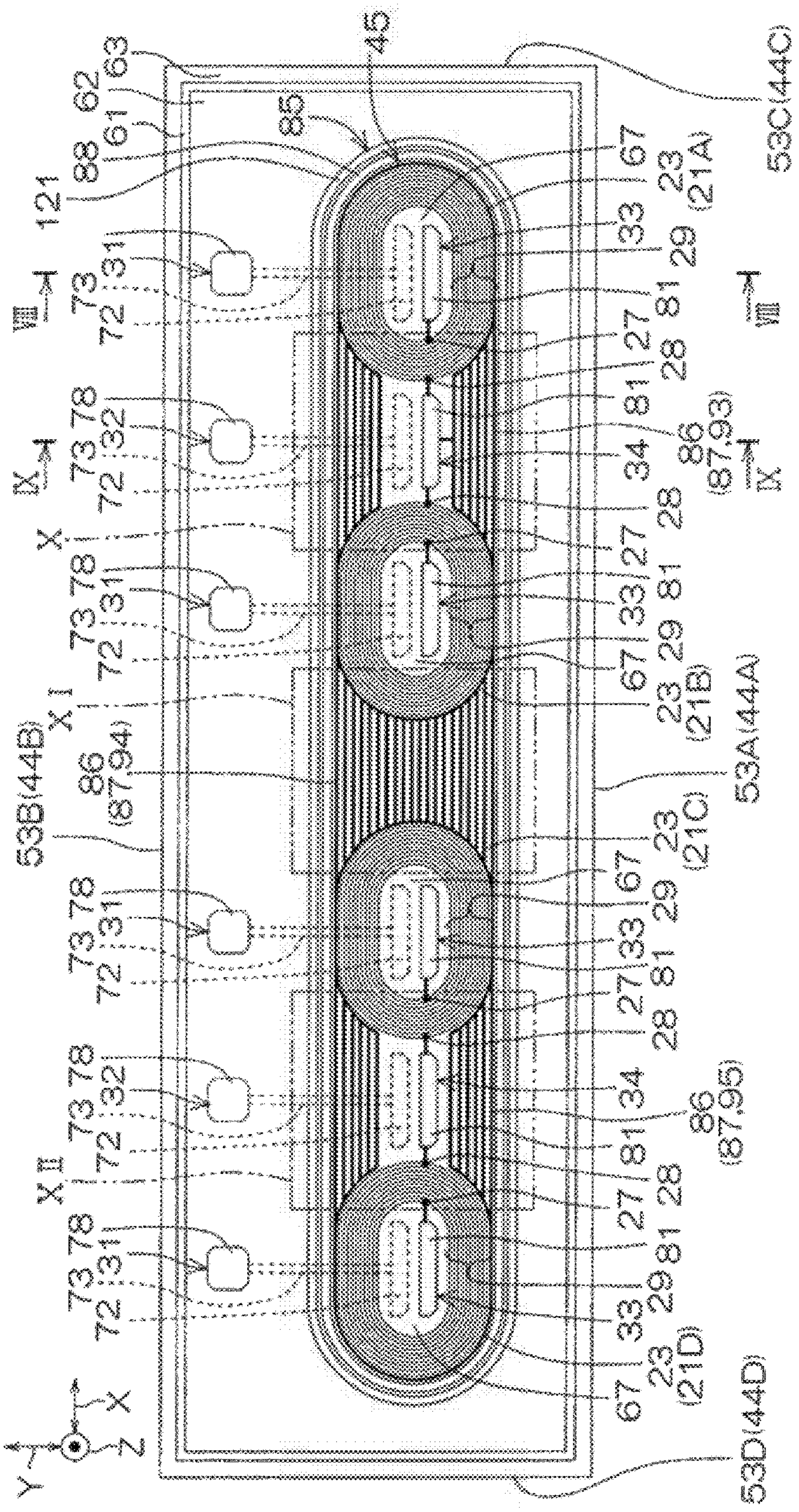
FIG. 6 is a plan view of a layer in the semiconductor device shown in FIG. 3 where high-potential coils are formed.
Figure 7:
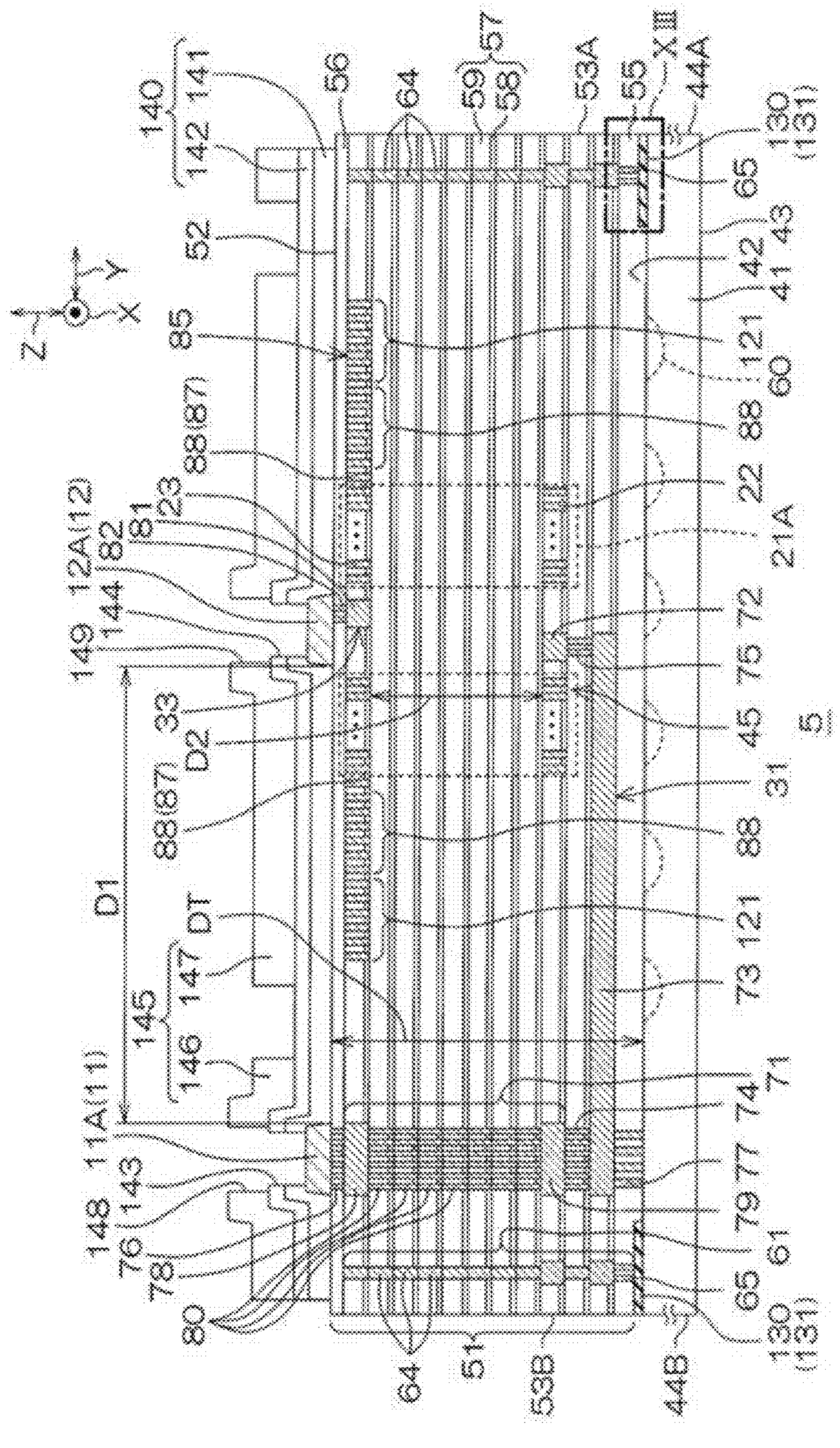
FIG. 7 is a cross-sectional view taken along line VIII-VIII shown in FIG. 6.
Figure 8:
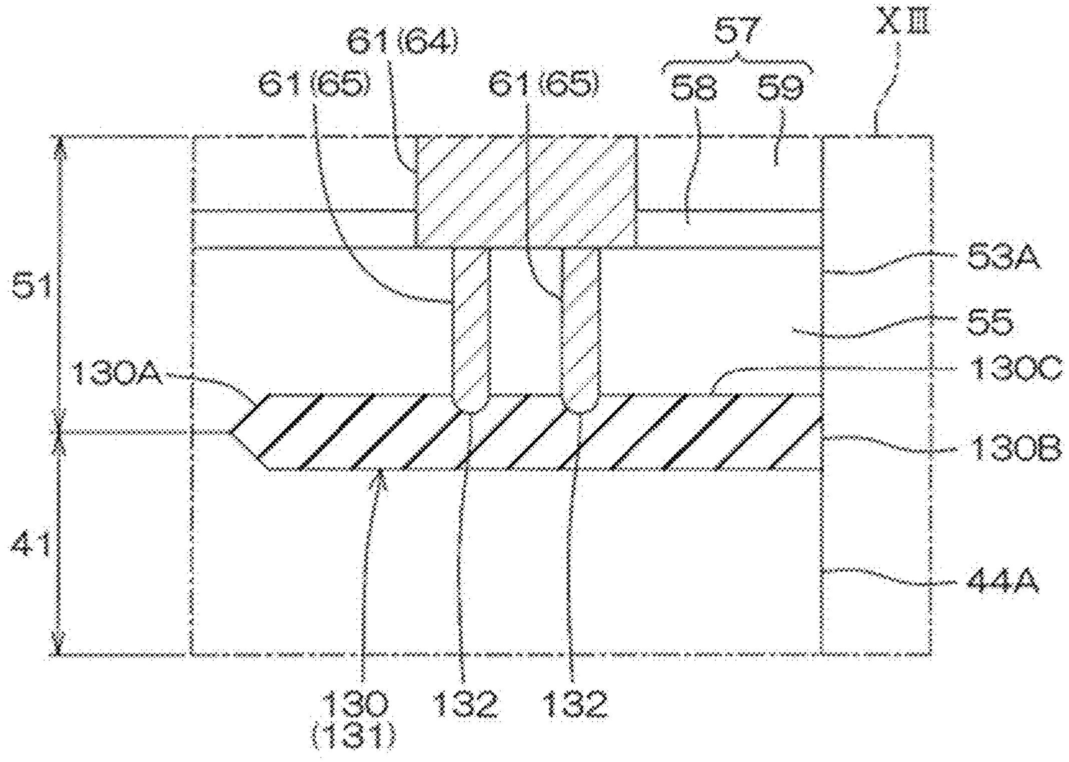
FIG. 8 is an enlarged view (showing a separation structure) of region XIII shown in FIG. 7.

FIG. 3 is a perspective view of a semiconductor device 5 used as a two-channel transformer chip. FIG. 4 is a plan view of the semiconductor device 5 shown in FIG. 3. FIG. 5 is a plan view showing a layer in the semiconductor device 5 shown in FIG. 3 where low-potential coils 22 (corresponding to the primary coils of transformers) are formed. FIG. 6 is a plan view showing a layer in the semiconductor device 5 shown in FIG. 3 where high-potential coils 23 (corresponding to the secondary coils of transformers) are formed. FIG. 7 is a sectional view along line VIII-VIII shown in FIG. 6. FIG. 8 is an enlarged view of region XIII shown in FIG. 7, which shows a separation structure 130.

Referring to FIG. 3 to FIG. 7, the semiconductor device 5 includes a semiconductor chip 41 in the shape of a rectangular parallelepiped. The semiconductor chip 41 contains at least one of silicon, a wide band gap semiconductor, and a compound semiconductor.

The wide band gap semiconductor is a semiconductor with a band gap larger than that of silicon (about 1.12 cV). Preferably, the wide band gap semiconductor has a band gap of 2.0 eV or more. The wide band gap semiconductor can be SiC (silicon carbide). The compound semiconductor can be a III-V group compound semiconductor. The compound semiconductor can contain at least one of aluminum nitride (AlN), indium nitride (InN), gallium nitride (GaN), and gallium arsenide (GaAs).

In the embodiment, the semiconductor chip 41 includes a semiconductor substrate made of silicon. The semiconductor chip 41 can be an epitaxial substrate that has a stacked structure composed of a semiconductor substrate made of silicon and an epitaxial layer made of silicon. The semiconductor substrate can be of an n-type or p-type conductivity. The epitaxial layer can be of an n-type or p-type.

The semiconductor chip 41 has a first principal surface 42 at one side, a second principal surface 43 at the other side, and chip side walls 44A to 44D that connect the first and second principal surfaces 42 and 43 together. As seen in a plan view from the normal direction Z to them (hereinafter simply expressed as "as seen in a plan view"), the first and second principal surfaces 42 and 43 are each formed in a quadrangular shape (in the embodiment, in a rectangular shape).

The chip side walls 44A to 44D includes a first chip side wall 44A, a second chip side wall 44B, a third chip side wall 44C, and a fourth chip side wall 44D. The first and second chip side walls 44A and 44B constitute the longer sides of the semiconductor chip 41. The first and second chip side walls 44A and 44B extend along a first direction X and face away from each other in a second direction Y. The third and fourth chip side walls 44C and 44D constitute the shorter sides of the semiconductor chip 41. The third and fourth chip side walls 44C and 44D extend in the second direction Y and face away from each other in the first direction X. The chip side walls 44A to 44D have polished surfaces.

The semiconductor device 5 further includes an insulation layer 51 formed on the first principal surface 42 of the semiconductor chip 41. The insulation layer 51 has an insulation principal surface 52 and insulation side walls 53A to 53D. The insulation principal surface 52 is formed in a quadrangular shape (in the embodiment, a rectangular shape) that fits the first principal surface 42 as seen in a plan view. The insulation principal surface 52 extends parallel to the first principal surface 42.

The insulation side walls 53A to 53D include a first insulation side wall 53A, a second insulation side wall 53B, a third insulation side wall 53C, and a fourth insulation side wall 53D. The insulation side walls 53A to 53D extend from the circumferential edge of the insulation principal surface 52 toward the semiconductor chip 41 and are continuous with the chip side walls 44A to 44D. Specifically, the insulation side walls 53A to 53D are formed to be flush with the chip side walls 44A to 44D. The insulation side walls 53A to 53D constitute polished surfaces that are flush with the chip side walls 44A to 44D.

The insulation layer 51 has a stacked structure of multi-layer insulation layers that include a bottom insulation layer 55, a top insulation layer 56, and a plurality of (in the embodiment, eleven) interlayer insulation layers 57. The bottom insulation layer 55 is an insulation layer that directly covers the first principal surface 42. The top insulation layer 56 is an insulation layer that constitutes the insulation principal surface 52. The plurality of interlayer insulation layers 57 are insulation layers that are interposed between the bottom and top insulation layers 55 and 56. In the embodiment, the bottom insulation layer 55 has a single-layer structure that contains silicon oxide. In the embodiment, the top insulation layer 56 has a single-layer structure that contains silicon oxide. The bottom and top insulation layers 55 and 56 can each have a thickness of 1 μm or more but 3 μm or less (e.g., about 2 μm).

The plurality of interlayer insulation layers 57 each have a stacked structure that includes a first insulation layer 58 at the bottom insulation layer 55 side and a second insulation layer 59 at the top insulation layer 56 side. The first insulation layer 58 can contain silicon nitride. The first insulation layer 58 is formed as an etching stopper layer for the second insulation layer 59. The first insulation layer 58 can have a thickness of 0.1 μm or more but 1 μm or less (e.g., about 0.3 μm).

The second insulation layer 59 is formed on top of the first insulation layer 58 and contains an insulating material different from that of the first insulation layer 58. The second insulation layer 59 can contain silicon oxide. The second insulation layer 59 can have a thickness of 1 μm or more but 3 μm or less (e.g., about 2 μm). Preferably, the second insulation layer 59 is given a thickness larger than that of the first insulation layer 58.

The insulation layer 51 can have a total thickness DT of 5 μm or more but 50 μm or less. The insulation layer 51 can have any total thickness DT and any number of interlayer insulation layers 57 stacked together, which are adjusted according to the desired dielectric strength voltage (dielectric breakdown withstand voltage). The bottom insulation layer 55, the top insulation layer 56, and the interlayer insulation layers 57 can employ any insulating material, which is thus not limited to any particular insulating material.

The semiconductor device 5 includes a first functional device 45 formed in the insulation layer 51. The first functional device 45 includes one or a plurality of (in the embodiment, a plurality of) transformers 21 (corresponding to the transformers mentioned previously). That is, the semiconductor device 5 is a multichannel device that includes a plurality of transformers 21. The plurality of transformers 21 are formed in an inner part of the insulation layer 51, at intervals from the insulation side walls 53A to 53D. The plurality of transformers 21 are formed at intervals from each other in the first direction X.

Specifically, the plurality of transformers 21 include a first transformer 21A, a second transformer 21B, a third transformer 21C, and a fourth transformer 21D that are formed in this order from the insulation side wall 53C side to the insulation side wall 53D side as seen in a plan view. The plurality of transformers 21A to 21D have similar structures. In the following description, the structure of the first transformer 21A will be described as an example. No separate description will be given of the structures of the second, third, and fourth transformers 21B, 21C, and 21D, to which the description of the structure of the first transformer 21A is to be taken to apply.

Referring to FIG. 5 to FIG. 7, the first transformer 21A includes a low-potential coil 22 and a high-potential coil 23. The low-potential coil 22 is formed in the insulation layer 51. The high-potential coil 23 is formed in the insulation layer 51 so as to face the low-potential coil 22 in the normal direction Z. In the embodiment, the low- and high-potential coils 22 and 23 are formed in a region between the bottom and top insulation layers 55 and 56 (i.e., in the plurality of interlayer insulation layers 57).

The low-potential coil 22 is formed in the insulation layer 51, at the bottom insulation layer 55 (semiconductor chip 41) side, and the high-potential coil 23 is formed in the insulation layer 51, at the top insulation layer 56 (insulation principal surface 52) side with respect to the low-potential coil 22. That is, the high-potential coil 23 faces the semiconductor chip 41 across the low-potential coil 22. The low- and high-potential coils 22 and 23 can be disposed at any places. The high-potential coil 23 can face the low-potential coil 22 across one or more interlayer insulation layers 57.

The distance between the low- and high-potential coils 22 and 23 (i.e., the number of interlayer insulation layers 57 stacked together) is adjusted appropriately according to the dielectric strength voltage and electric field strength between the low- and high-potential coils 22 and 23. In the embodiment, the low-potential coil 22 is formed in the third interlayer insulation layer 57 as counted from the bottom insulation layer 55 side. In the embodiment, the high-potential coil 23 is formed in the first interlayer insulation layer 57 as counted from the top insulation layer 56 side.

The low-potential coil 22 is embedded in the interlayer insulation layer 57 so as to penetrate the first and second insulation layers 58 and 59. The low-potential coil 22 includes a first inner end 24, a first outer end 25, and a first spiral portion 26 that is patterned in a spiral shape between the first inner and outer ends 24 and 25. The first spiral portion 26 is patterned in a spiral shape that extends in an elliptical (oval) shape as seen in a plan view. The part of the first spiral portion 26 that forms its inner circumferential edge defines a first inner region 66 that is in an elliptical shape as seen in a plan view.

The first spiral portion 26 can have a number of turns of 5 or more but 30 or less. The first spiral portion 26 can have a width of 0.1 μm or more but 5 μm or less. Preferably, the first spiral portion 26 has a width of 1 μm or more but 3 μm or less. The width of the first spiral portion 26 is defined by its width in the direction orthogonal to the spiraling direction. The first spiral portion 26 has a first winding pitch of 0.1 μm or more but 5 μm or less. Preferably, the first winding pitch is 1 μm or more but 3 μm or less. The first winding pitch is defined by the distance between two parts of the first spiral portion 26 that are adjacent to each other in the direction orthogonal to the spiraling direction.

The first spiral portion 26 can have any winding shape and the first inner region 66 can have any planar shape, which are thus not limited to those shown in FIG. 5 etc. The first spiral portion 26 can be wound in a polygonal shape, such as a triangular or quadrangular shape, or in a circular shape as seen in a plan view. The first inner region 66 can be defined, so as to fit the winding shape of the first spiral portion 26, in a polygonal shape, such as a triangular or quadrangular shape, or in a circular shape as seen in a plan view.

The low-potential coil 22 can contain at least one of titanium, titanium nitride, copper, aluminum, and tungsten. The low-potential coil 22 can have a stacked structure composed of a barrier layer and a body layer. The barrier layer defines a recessed space in the interlayer insulation layer 57. The barrier layer can contain at least one of titanium and titanium nitride. The body layer can contain at least one of copper, aluminum, and tungsten.

The high-potential coil 23 is embedded in the interlayer insulation layer 57 so as to penetrate the first and second insulation layers 58 and 59. The high-potential coil 23 includes a second inner end 27, a second outer end 28, and a second spiral portion 29 that is patterned in a spiral shape between the second inner and outer ends 27 and 28. The second spiral portion 29 is patterned in a spiral shape that extends in an elliptical (oval) shape as seen in a plan view. The part of the second spiral portion 29 that forms its inner circumferential edge defines a second inner region 67 that is in an elliptical shape as seen in a plan view in the embodiment. The second inner region 67 in the second spiral portion 29 faces the first inner region 66 in the first spiral portion 26 in the normal direction Z.

The second spiral portion 29 can have a number of turns of 5 or more but 30 or less. The number of turns of the second spiral portion 29 relative to that of the first spiral portion 26 is adjusted according to the target value of voltage boosting. Preferably, the number of turns of the second spiral portion 29 is larger than that of the first spiral portion 26. Needless to say, the number of turns of the second spiral portion 29 can be smaller than or equal to that of the first spiral portion 26.

The second spiral portion 29 can have a width of 0.1 μm or more but 5 μm or less. Preferably, the second spiral portion 29 has a width of 1 μm or more but 3 μm or less. The width of the second spiral portion 29 is defined by its width in the direction orthogonal to the spiraling direction. Preferably, the width of the second spiral portion 29 is equal to the width of the first spiral portion 26.

The second spiral portion 29 can have a second winding pitch of 0.1 μm or more but 5 μm or less. Preferably, the second winding pitch is 1 μm or more but 3 μm or less. The second winding pitch is defined by the distance between two parts of the second spiral portion 29 that are adjacent to each other in the direction orthogonal to the spiraling direction. Preferably, the second winding pitch is equal to the first winding pitch of the first spiral portion 26.

The second spiral portion 29 can have any winding shape and the second inner region 67 can have any planar shape, which are thus not limited to those shown in FIG. 6 etc. The second spiral portion 29 can be wound in a polygonal shape, such as a triangular or quadrangular shape, or in a circular shape as seen in a plan view. The second inner region 67 can be defined, so as to fit the winding shape of the second spiral portion 29, in a polygonal shape, such as a triangular or quadrangular shape, or in a circular shape as seen in a plan view.

Preferably, the high-potential coil 23 is formed of the same conductive material as the low-potential coil 22. That is, preferably, like the low-potential coil 22, the high-potential coil 23 includes a barrier layer and a body layer.

Referring to FIG. 4, the semiconductor device 5 includes a plurality of (in the diagram, twelve) low-potential terminals 11 and a plurality of (in the diagram, twelve) high-potential terminals 12. The plurality of low-potential terminals 11 are electrically connected to the low-potential coils 22 of the corresponding transformers 21A to 21D respectively. The plurality of high-potential terminals 12 are electrically connected to the high-potential coils 23 of the corresponding transformers 21A to 21D respectively.

The plurality of low-potential terminals 11 are formed on the insulation principal surface 52 of the insulation layer 51. Specifically, the plurality of low-potential terminals 11 are formed in a second insulation side wall 53B side region, at an interval from the plurality of transformers 21A to 21D in the second direction Y, and are arrayed at intervals from each other in the first direction X.

The plurality of low-potential terminals 11 include a first low-potential terminal 11A, a second low-potential terminal 11B, a third low-potential terminal 11C, a fourth low-potential terminal 11D, a fifth low-potential terminal 11E, and a sixth low-potential terminal 11F. Actually, in the embodiment, two each of the plurality of low-potential terminals 11A to 11F are formed. The plurality of low-potential terminals 11A to 11F may each include any number of terminals.

The first low-potential terminal 11A faces the first transformer 21A in the second direction Y as seen in a plan view.

The second low-potential terminal 11B faces the second transformer 21B in the second direction Y as seen in a plan view. The third low-potential terminal 11C faces the third transformer 21C in the second direction Y as seen in a plan view. The fourth low-potential terminal 11D faces the fourth transformer 21D in the second direction Y as seen in a plan view. The fifth low-potential terminal 11E is formed in a region between the first and second low-potential terminals 11A and 11B as seen in a plan view. The sixth low-potential terminal 11F is formed in a region between the third and fourth low-potential terminals 11C and 11D as seen in a plan view.

The first low-potential terminal 11A is electrically connected to the first inner end 24 of the first transformer 21A (low-potential coil 22). The second low-potential terminal 11B is electrically connected to the first inner end 24 of the second transformer 21B (low-potential coil 22). The third low-potential terminal 11C is electrically connected to the first inner end 24 of the third transformer 21C (low-potential coil 22). The fourth low-potential terminal 11D is electrically connected to the first inner end 24 of the fourth transformer 21D (low-potential coil 22).

The fifth low-potential terminal 11E is electrically connected to the first outer end 25 of the first transformer 21A (low-potential coil 22) and to the first outer end 25 of the second transformer 21B (low-potential coil 22). The sixth low-potential terminal 11F is electrically connected to the first outer end 25 of the third transformer 21C (low-potential coil 22) and to the first outer end 25 of the fourth transformer 21D (low-potential coil 22).

The plurality of high-potential terminals 12 are formed on the insulation principal surface 52 of the insulation layer 51, at an interval from the plurality of low-potential terminals 11. Specifically, the plurality of high-potential terminals 12 are formed in a first insulation side wall 53A side region, at an interval from the plurality of low-potential terminals 11 in the second direction Y, and are arrayed at intervals from each other in the first direction X.

The plurality of high-potential terminals 12 are formed in regions close to the corresponding transformers 21A to 21D, respectively, as seen in a plan view. The high-potential terminals 12 being close to the transformers 21A to 21D means that, as seen in a plan view, the distance between the high-potential terminals 12 and the transformers 21 is smaller than the distance between the low-potential terminals 11 and the high-potential terminals 12.

Specifically, as seen in a plan view, the plurality of high-potential terminals 12 are formed at intervals from each other along the first direction X so as to face the plurality of transformers 21A to 21D along the first direction X. More specifically, as seen in a plan view, the plurality of high-potential terminals 12 are formed at intervals from each other along the first direction X so as to be located in the second inner regions 67 in the high-potential coils 23 and in regions between adjacent high-potential coils 23. As a result, as seen in a plan view, the plurality of high-potential terminals 12 are, along with the transformers 21A to 21D, arrayed in one row along the first direction X.

The plurality of high-potential terminals 12 include a first high-potential terminal 12A, a second high-potential terminal 12B, a third high-potential terminal 12C, a fourth high-potential terminal 12D, a fifth high-potential terminal 12E, and a sixth high-potential terminal 12F. Actually, in the embodiment, two each of the plurality of high-potential terminals 12A to 12F are formed. The plurality of high-potential terminals 12A to 12F may each include any number of terminals.

The first high-potential terminal 12A is formed in the second inner region 67 in the first transformer 21A (high-potential coil 23) as seen in a plan view. The second high-potential terminal 12B is formed in the second inner region 67 in the second transformer 21B (high-potential coil 23) as seen in a plan view. The third high-potential terminal 12C is formed in the second inner region 67 in the third transformer 21C (high-potential coil 23) as seen in a plan view. The fourth high-potential terminal 12D is formed in the second inner region 67 in the fourth transformer 21D (high-potential coil 23) as seen in a plan view. The fifth high-potential terminal 12E is formed in a region between the first and second transformers 21A and 21B as seen in a plan view. The sixth high-potential terminal 12F is formed in a region between the third and fourth transformers 21C and 21D as seen in a plan view.

The first high-potential terminal 12A is electrically connected to the second inner end 27 of the first transformer 21A (high-potential coil 23). The second high-potential terminal 12B is electrically connected to the second inner end 27 of the second transformer 21B (high-potential coil 23). The third high-potential terminal 12C is electrically connected to the second inner end 27 of the third transformer 21C (high-potential coil 23). The fourth high-potential terminal 12D is electrically connected to the second inner end 27 of the fourth transformer 21D (high-potential coil 23).

The fifth high-potential terminal 12E is electrically connected to the second outer end 28 of the first transformer 21A (high-potential coil 23) and to the second outer end 28 of the second transformer 21B (high-potential coil 23). The sixth high-potential terminal 12F is electrically connected to the second outer end 28 of the third transformer 21C (high-potential coil 23) and to the second outer end 28 of the fourth transformer 21D (high-potential coil 23).

Referring to FIG. 5 and FIG. 7, the semiconductor device 5 includes a first low-potential wiring 31, a second low-potential wiring 32, a first high-potential wiring 33, and a second high-potential wiring 34, all formed in the insulation layer 51. Actually, in the embodiment, a plurality of first low-potential wirings 31, a plurality of second low-potential wirings 32, a plurality of first high-potential wirings 33, and a plurality of second high-potential wirings 34 are formed.

The first and second low-potential wirings 31 and 32 hold the low-potential coils 22 of the first and second transformers 21A and 21B at equal potentials. The first and second low-potential wirings 31 and 32 also hold the low-potential coils 22 of the third and fourth transformers 21C and 21D at equal potentials. In the embodiment, the first and second low-potential wirings 31 and 32 hold the low-potential coils 22 of all the transformers 21A to 21D at equal potentials.

The first and second high-potential wirings 33 and 34 hold the high-potential coils 23 of the first and second transformers 21A and 21B at equal potentials. The first and second high-potential wirings 33 and 34 also hold the high-potential coils 23 of the third and fourth transformers 21C and 21D at equal potentials. In the embodiment, the first and second high-potential wirings 33 and 34 hold the high-potential coils 23 of all the transformers 21A to 21D at equal potentials.

The plurality of first low-potential wirings 31 are electrically connected respectively to the corresponding low-potential terminals 11A to 11D and to the first inner ends 24 of the corresponding transformers 21A to 21D (low-potential coils 22). The plurality of first low-potential wirings 31 have similar structures. In the following description, the structure of the first low-potential wiring 31 connected to the first low-potential terminal 11A and to the first transformer 21A will be described as an example. No separate description will be given of the structures of the other first low-potential wirings 31, to which the description of the structure of the first low-potential wiring 31 connected to the first transformer 21A is to be taken to apply.

The first low-potential wiring 31 includes a through wiring 71, a low-potential connection wiring 72, a lead wiring 73, a first connection plug electrode 74, a second connection plug electrode 75, one or a plurality of (in this embodiment, a plurality of) pad plug electrodes 76, and one or a plurality of (in this embodiment, a plurality of) substrate plug electrodes 77.

Preferably, the through wiring 71, the low-potential connection wiring 72, the lead wiring 73, the first connection plug electrode 74, the second connection plug electrode 75, the pad plug electrodes 76, and the substrate plug electrodes 77 are formed of the same conductive material as the low-potential coil 22 and the like. That is, preferably, like the low-potential coil 22 and the like, the through wiring 71, the low-potential connection wiring 72, the lead wiring 73, the first connection plug electrode 74, the second connection plug electrode 75, the pad plug electrodes 76, and the substrate plug electrodes 77 each include a barrier layer and a body layer.

The through wiring 71 penetrates a plurality of interlayer insulation layers 57 in the insulation layer 51 and extends in a columnar shape along the normal direction Z. In the embodiment, the through wiring 71 is formed in a region between the bottom and top insulation layers 55 and 56 in the insulation layer 51. The through wiring 71 has a top end part at the top insulation layer 56 side and a bottom end part at the bottom insulation layer 55 side. The top end part of the through wiring 71 is formed in the same interlayer insulation layer 57 as the high-potential coil 23 and is covered by the top insulation layer 56. The bottom end part of the through wiring 71 is formed in the same interlayer insulation layer 57 as the low-potential coil 22.

In the embodiment, the through wiring 71 includes a first electrode layer 78, a second electrode layer 79, and a plurality of wiring plug electrodes 80. In the through wiring 71, the first and second electrode layers 78 and 79 and the wiring plug electrodes 80 are formed of the same conductive material as the low-potential coil 22 and the like. That is, like the low-potential coil 22 and the like, the first and second electrode layers 78 and 79 and the wiring plug electrodes 80 each include a barrier layer and a body layer.

The first electrode layer 78 constitutes the top end part of the through wiring 71. The second electrode layer 79 constitutes the bottom end part of the through wiring 71. The first electrode layer 78 is formed as an island, and faces the low-potential terminal 11 (first low-potential terminal 11A) in the normal direction Z. The second electrode layer 79 is formed as an island, and faces the first electrode layer 78 in the normal direction Z.

The plurality of wiring plug electrodes 80 are embedded respectively in the plurality of interlayer insulation layers 57 located in a region between the first and second electrode layers 78 and 79. The plurality of wiring plug electrodes 80 are stacked together from the bottom insulation layer 55 to the top insulation layer 56 so as to be electrically connected together, and electrically connect together the first and second electrode layers 78 and 79. The plurality of wiring plug electrodes 80 each have a plane area smaller than the plane area of either of the first and second electrode layers 78 and 79.

The number of layers stacked in the plurality of wiring plug electrodes 80 is equal to the number of layers stacked in the plurality of interlayer insulation layers 57. In the embodiment, six wiring plug electrodes 80 are embedded in interlayer insulation layers 57 respectively, and any number of wiring plug electrodes 80 can be embedded in interlayer insulation layers 57 respectively. Needless to say, one or a plurality of wiring plug electrodes 80 can be formed that penetrates a plurality of interlayer insulation layers 57.

The low-potential connection wiring 72 is formed in the same interlayer insulation layer 57 as the low-potential coil 22, in the first inner region 66 in the first transformer 21A (low-potential coil 22). The low-potential connection wiring 72 is formed as an island and faces the high-potential terminal 12 (first high-potential terminal 12A) in the normal direction Z. Preferably, the low-potential connection wiring 72 has a plane area larger than the plane area of the wiring plug electrode 80. The low-potential connection wiring 72 is electrically connected to the first inner end 24 of the low-potential coil 22.

The lead wiring 73 is formed in the interlayer insulation layer 57, in a region between the semiconductor chip 41 and the through wiring 71. In the embodiment, the lead wiring 73 is formed in the first interlayer insulation layer 57 as counted from the bottom insulation layer 55. The lead wiring 73 has a first end part at one side, a second end part at the other side, and a wiring part that connects together the first and second end parts. The first end part of the lead wiring 73 is located in a region between the semiconductor chip 41 and the bottom end part of the through wiring 71. The second end part of the lead wiring 73 is located in a region between the semiconductor chip 41 and the low-potential connection wiring 72. The wiring part extends along the first principal surface 42 of the semiconductor chip 41 and extends in the shape of a stripe in a region between the first and second end parts.

The first connection plug electrode 74 is formed in the interlayer insulation layer 57, in a region between the through wiring 71 and the lead wiring 73, and is electrically connected to the through wiring 71 and to the first end part of the lead wiring 73. The second connection plug electrode 75 is formed in the interlayer insulation layer 57, in a region between the low-potential connection wiring 72 and the lead wiring 73 and is electrically connected to the low-potential connection wiring 72 and to the second end part of the lead wiring 73.

The plurality of pad plug electrodes 76 are formed in the top insulation layer 56, in a region between the low-potential terminal 11 (first low-potential terminal 11A) and the through wiring 71, and are electrically connected to the low-potential terminal 11 and to the top end part of the through wiring 71. The plurality of substrate plug electrodes 77 are formed in the bottom insulation layer 55, in a region between the semiconductor chip 41 and the lead wiring 73. In the embodiment, the substrate plug electrodes 77 are formed in a region between the semiconductor chip 41 and the first end part of the lead wiring 73, and are electrically connected to the semiconductor chip 41 and to the first end part of the lead wiring 73.

Referring to FIG. 6 and FIG. 7, the plurality of first high-potential wirings 33 are connected respectively to the corresponding high-potential terminals 12A to 12D and to the second inner ends 27 of the corresponding transformers 21A to 21D (high-potential coils 23). The plurality of first high-potential wirings 33 have similar structures. In the following description, the structure of the first high-potential wiring 33 connected to the first high-potential terminal 12A and to the first transformer 21A will be described as an example. No description will be given of the structures of the other first high-potential wirings 33, to which the description of the structure of the first high-potential wiring 33 connected to the first transformer 21A is to be taken to apply.

The first high-potential wiring 33 includes a high-potential connection wiring 81 and one or a plurality of (in this embodiment, a plurality of) pad plug electrodes 82. Preferably, the high-potential connection wiring 81 and the pad plug electrodes 82 are formed of the same conductive material as the low-potential coil 22 and the like. That is, preferably, like the low-potential coil 22 and the like, the high-potential connection wiring 81 and the pad plug electrodes 82 each include a barrier layer and a body layer.

The high-potential connection wiring 81 is formed in the same interlayer insulation layer 57 as the high-potential coil 23, in the second inner region 67 in the high-potential coil 23. The high-potential connection wiring 81 is formed as an island, and faces the high-potential terminal 12 (first high-potential terminal 12A) in the normal direction Z. The high-potential connection wiring 81 is electrically connected to the second inner end 27 of the high-potential coil 23. The high-potential connection wiring 81 is formed at an interval from the low-potential connection wiring 72 as seen in a plan view, and does not face the low-potential connection wiring 72 in the normal direction Z. This results in an increased insulation distance between the low- and high-potential connection wirings 72 and 81 and hence an increased dielectric strength voltage in the insulation layer 51.

The plurality of pad plug electrodes 82 are formed in the top insulation layer 56, in a region between the high-potential terminal 12 (first high-potential terminal 12A) and the high-potential connection wiring 81, and are electrically connected to the high-potential terminal 12 and to the high-potential connection wiring 81. The plurality of pad plug electrodes 82 each have a plane area smaller than the plane area of the high-potential connection wiring 81 as seen in a plan view.

Referring to FIG. 7, preferably, the distance D1 between the low- and high-potential terminals 11 and 12 is larger than the distance D2 between the low- and high-potential coils 22 and 23 (D2<D1). Preferably, the distance D1 is larger than the total thickness DT of the plurality of interlayer insulation layers 57 (DT<D1). The ratio D2/D1 of the distance D2 to the distance D1 can be 0.01 or more but 0.1 or less. Preferably, the distance D1 is 100 μm or more but 500 μm or less. The distance D2 can be 1 μm or more but 50 μm or less. Preferably, the distance D2 is 5 μm or more but 25 μm or less. The distances D1 and D2 can have any values, which are adjusted appropriately according to the desired dielectric strength voltage.

Referring to FIG. 6 and FIG. 7, the semiconductor device 5 has a dummy pattern 85 that is embedded in the insulation layer 51 so as to be located around the transformers 21A to 21D as seen in a plan view.

The dummy pattern 85 is formed in a pattern different (discontinuous) from that of either of the high- and low-potential coils 23 and 22 and is independent of the transformers 21A to 21D. That is, the dummy pattern 85 does not function as part of the transformers 21A to 21D. The dummy pattern 85 is formed as a shield conductor layer that shields electric fields between the low- and high-potential coils 22 and 23 in the transformers 21A to 21D to suppress electric field concentration on the high-potential coil 23. In the embodiment, the dummy pattern 85 is patterned at a line density per unit area that is equal to the line density of the high-potential coil 23. The line density of the dummy pattern 85 being equal to the line density of the high-potential coil 23 means that the line density of the dummy pattern 85 falls within the range of +20% of the line density of the high-potential coil 23.

The dummy pattern 85 can be formed at any depth in the insulation layer 51, which is adjusted according to the electric field strength to be attenuated. Preferably, the dummy pattern 85 is formed in a region closer to the high-potential coil 23 than to the low-potential coil 22 with respect to the normal direction Z. The dummy pattern 85 being closer to the high-potential coil 23 with respect to the normal direction Z means that, with respect to the normal direction Z, the distance between the dummy pattern 85 and the high-potential coil 23 is smaller than the distance between the dummy pattern 85 and the low-potential coil 22.

In that way, electric field concentration on the high-potential coil 23 can be suppressed properly. The smaller the distance between the dummy pattern 85 and the high-potential coil 23 with respect to the normal direction Z, the more effectively electric field concentration on the high-potential coil 23 can be suppressed. Preferably, the dummy pattern 85 is formed in the same interlayer insulation layer 57 as the high-potential coil 23. In that way, electric field concentration on the high-potential coil 23 can be suppressed more properly. The dummy pattern 85 includes a plurality of dummy patterns that are in varying electrical states. The dummy pattern 85 can include a high-potential dummy pattern.

The high-potential dummy pattern 86 can be formed at any depth in the insulation layer 51, which is adjusted according to the electric field strength to be attenuated. Preferably, the high-potential dummy pattern 86 is formed in a region closer to the high-potential coil 23 than to the low-potential coil 22 with respect to the normal direction Z. The high-potential dummy pattern 86 being closer to the high-potential coil 23 with respect to the normal direction Z means that, with respect to the normal direction Z, the distance between the high-potential dummy pattern 86 and the high-potential coil 23 is smaller than the distance between the high-potential dummy pattern 86 and the low-potential coil 22.

The dummy pattern 85 includes a floating dummy pattern that is formed in an electrically floating state in the insulation layer 51 so as to be located around the transformers 21A to 21D.

In the embodiment, the floating dummy pattern is patterned in dense lines so as to partly cover and partly expose a region around the high-potential coil 23 as seen in a plan view. The floating dummy pattern can be formed so as to have ends or no ends.

The floating dummy pattern can be formed at any depth in the insulation layer 51, which is adjusted according to the electric field strength to be attenuated.

Any number of floating lines can be provided, which is adjusted according to the electric field strength to be attenuated. The floating dummy pattern can include a plurality of floating dummy patterns.

Referring to FIG. 7, the semiconductor device 5 includes a second functional device 60 that is formed in the first principal surface 42 of the semiconductor chip 41 in a device region 62. The second functional device 60 is formed using a superficial part of the first principal surface 42 and/or a region on the first principal surface 42 of the semiconductor chip 41, and is covered by the insulation layer 51 (bottom insulation layer 55). In FIG. 7, the second functional device 60 is shown in a simplified form by broken lines indicated in a superficial part of the first principal surface 42.

The second functional device 60 is electrically connected to a low-potential terminal 11 via a low-potential wiring and is electrically connected to a high-potential terminal 12 via a high-potential wiring. Except that the low-potential wiring is patterned in the insulation layer 51 so as to be connected to the second functional device 60, it has a similar structure to the first low-potential wiring 31 (second low-potential wiring 32). Except that the high-potential wiring is patterned in the insulation layer 51 so as to be connected to the second functional device 60, it has a similar structure to the first high-potential wiring 33 (second high-potential wiring 34). No description will be given of the low- and high-potential wirings associated with the second functional device 60.

The second functional device 60 can include at least one of a passive device, a semiconductor rectification device, and a semiconductor switching device. The second functional device 60 can include a circuit network comprising a selective combination of any two or more of a passive device, a semiconductor rectification device, and a semiconductor switching device. The circuit network can constitute part or the whole of an integrated circuit.

The passive device can include a semiconductor passive device. The passive device can include one or both of a resistor and a capacitor. The semiconductor rectification device can include at least one of a pn-junction diode, a PIN diode, a Zener diode, a Schottky barrier diode, and a fast-recovery diode. The semiconductor switching device can include at least one of a BJT (bipolar junction transistor), a MISFET (metal-insulator-semiconductor field-effect transistor), an IGBT (insulated-gate bipolar junction transistor), and a JFET (junction field-effect transistor).

Referring to FIG. 5 to FIG. 7, the semiconductor device 5 further includes a scaling conductor 61 embedded in the insulation layer 51. The scaling conductor 61 is embedded in the form of walls in the insulation layer 51, at intervals from the insulation side walls 53A to 53D as seen in a plan view and partitions the insulation layer 51 into the device region 62 and an outer region 63. The scaling conductor 61 prevents moisture entry and crack development from the outer region 63 to the device region 62.

The device region 62 is a region that includes the first functional device 45 (plurality of transformers 21), the second functional device 60, the plurality of low-potential terminals 11, the plurality of high-potential terminals 12, the first low-potential wirings 31, the second low-potential wirings 32, the first high-potential wirings 33, the second high-potential wirings 34, and the dummy pattern 85. The outer region 63 is a region outside the device region 62.

The scaling conductor 61 is electrically isolated from the device region 62. Specifically, the scaling conductor 61 is electrically isolated from the first functional device 45 (plurality of transformers 21), the second functional device 60, the plurality of low-potential terminals 11, the plurality of high-potential terminals 12, the first low-potential wirings 31, the second low-potential wirings 32, the first high-potential wirings 33, the second high-potential wirings 34, and the dummy pattern 85. More specifically, the sealing conductor 61 is held in an electrically floating state. The sealing conductor 61 does not form a current path connected to the device region 62.

The scaling conductor 61 is formed in the shape of a stripe along the insulation side walls 53A to 53D as seen in a plan view. In the embodiment, the sealing conductor 61 is formed in a quadrangular ring shape (specifically, a rectangular ring shape) as seen in a plan view. Thus, the sealing conductor 61 defines the device region 62 in a quadrangular shape (specifically, a rectangular shape) as seen in a plan view. Furthermore, the sealing conductor 61 defines the outer region 63 in a quadrangular ring shape (specifically, a rectangular ring shape) surrounding the device region 62 as seen in a plan view.

Specifically, the scaling conductor 61 has a top end part at the insulation principal surface 52 side, a bottom end part at the semiconductor chip 41 side, and a wall part that extends in the form of walls between the top and bottom end parts. In the embodiment, the top end part of the sealing conductor 61 is formed at an interval from the insulation principal surface 52 toward the semiconductor chip 41 and is located in the insulation layer 51. In the embodiment, the top end part of the scaling conductor 61 is covered by the top insulation layer 56. The top end part of the sealing conductor 61 can be covered by one or a plurality of interlayer insulation layers 57. The top end part of the sealing conductor 61 can be exposed through the top insulation layer 56. The bottom end part of the sealing conductor 61 is formed at an interval from the semiconductor chip 41 toward the top end part.

Thus, in the embodiment, the sealing conductor 61 is embedded in the insulation layer 51 so as to be located at the semiconductor chip 41 side of the plurality of low-potential terminals 11 and the plurality of high-potential terminals 12. Moreover, in the insulation layer 51, the sealing conductor 61 faces, in the direction parallel to the insulation principal surface 52, the first functional device 45 (plurality of transformers 21), the first low-potential wirings 31, the second low-potential wirings 32, the first high-potential wirings 33, the second high-potential wirings 34, and the dummy pattern 85. In the insulation layer 51, the sealing conductor 61 can face, in the direction parallel to the insulation principal surface 52, part of the second functional device 60.

The scaling conductor 61 includes a plurality of scaling plug conductors 64 and one or a plurality of (in the embodiment, a plurality of) scaling via conductors 65. Any number of scaling via conductors 65 may be provided. Of the plurality of sealing plug conductors 64, the top scaling plug conductor 64 constitutes the top end part of the sealing conductor 61. The plurality of scaling via conductors 65 constitute the bottom end part of the sealing conductor 61. Preferably, the scaling plug conductors 64 and the sealing via conductors 65 are formed of the same conductive material as the low-potential coil 22. That is, preferably, like the low-potential coil 22 and the like, the scaling plug conductors 64 and the scaling via conductors 65 each include a barrier layer and a body layer.

The plurality of scaling plug conductors 64 are embedded in the plurality of interlayer insulation layers 57 respectively, and are each formed in a quadrangular ring shape (specifically, a rectangular ring shape) surrounding the device region 62. The plurality of scaling plug conductors 64 are stacked together from the bottom insulation layer 55 to the top insulation layer 56 so as to be connected together. The number of layers stacked in the plurality of scaling plug conductors 64 is equal to the number of layers in the plurality of interlayer insulation layers 57. Needless to say, one or a plurality of sealing plug conductors 64 may be formed that penetrates a plurality of interlayer insulation layers 57.

So long as a set of a plurality of sealing plug conductors 64 constitutes one ring-shaped scaling conductor 61, not all the sealing plug conductors 64 need be formed in a ring shape. For example, at least one of the plurality of sealing plug conductors 64 can be formed so as to have ends. Or at least one of the plurality of sealing plug conductors 64 may be divided into a plurality of strip-shaped portions with ends.

However, with consideration given to the risk of moisture entry and crack development into the device region 62, preferably, the plurality of scaling plug conductors 64 are formed so as to have no ends (in a ring shape).

The plurality of sealing via conductors 65 are formed in the bottom insulation layer 55, in a region between the semiconductor chip 41 and the scaling plug conductors 64. The plurality of scaling via conductors 65 are formed at an interval from the semiconductor chip 41 and are connected to the sealing plug conductors 64. The plurality of sealing via conductors 65 have a plane area smaller than the plane area of the sealing plug conductors 64. In a case where a single sealing via conductor 65 is formed, the single sealing via conductors 65 can have a plane area equal to or larger than the plane area of the sealing plug conductors 64.

The sealing conductor 61 can have a width of 0.1 μm or more but 10 μm or less. Preferably, the sealing conductor 61 has a width of 1 μm or more but 5 μm or less. The width of the sealing conductor 61 is defined by its width in the direction orthogonal to the direction in which it extends.

Referring to FIG. 7 and FIG. 8, the semiconductor device 5 further includes the separation structure 130 that is interposed between the semiconductor chip 41 and the sealing conductor 61 and that electrically isolates the sealing conductor 61 from the semiconductor chip 41. Preferably, the separation structure 130 includes an insulator. In the embodiment, the separation structure 130 is a field insulation film 131 formed on the first principal surface 42 of the semiconductor chip 41.

The field insulation film 131 includes at least one of an oxide film (silicon oxide film) and a nitride film (silicon nitride film). Preferably, the field insulation film 131 is a LOCOS (local oxidation of silicon) film as one example of an oxide film that is formed through oxidation of the first principal surface 42 of the semiconductor chip 41. The field insulation film 131 can have any thickness so long as it can insulate between the semiconductor chip 41 and the sealing conductor 61. The field insulation film 131 can have a thickness of 0.1 μm or more but 5 μm or less.

The separation structure 130 is formed on the first principal surface 42 of the semiconductor chip 41 and extends in the shape of a stripe along the sealing conductor 61 as seen in a plan view. In the embodiment, the separation structure 130 is formed in a quadrangular ring shape (specifically, a rectangular ring shape) as seen in a plan view. The separation structure 130 has a connection portion 132 to which the bottom end part of the scaling conductor 61 (i.e., the sealing via conductors 65) is connected. The connection portion 132 can form an anchor portion into which the bottom end part of the sealing conductor 61 (i.e., the sealing via conductors 65) is anchored toward the semiconductor chip 41. Needless to say, the connection portion 132 can be formed to be flush with the principal surface of the separation structure 130.

The separation structure 130 includes an inner end part 130A at the device region 62 side, an outer end part 130B at the outer region 63 side, and a main body part 130C between the inner and outer end parts 130A and 130B. As seen in a plan view, the inner end part 130A defines the region where the second functional device 60 is formed (i.e., the device region 62). The inner end part 130A can be formed integrally with an insulation film (not illustrated) formed on the first principal surface 42 of the semiconductor chip 41.

The outer end part 130B is exposed on the chip side walls 44A to 44D of the semiconductor chip 41 and is continuous with the chip side walls 44A to 44D of the semiconductor chip 41. More specifically, the outer end part 130B is formed so as to be flush with the chip side walls 44A to 44D of the semiconductor chip 41. The outer end part 130B constitutes a polished surface between, to be flush with, the chip side walls 44A to 44D of the semiconductor chip 41 and the insulation side walls 53A to 53D of the insulation layer 51. Needless to say, an embodiment is also possible where the outer end part 130B is formed within the first principal surface 42 at intervals from the chip side walls 44A to 44D.

The main body part 130C has a flat surface that extends substantially parallel to the first principal surface 42 of the semiconductor chip 41. The main body part 130C has the connection portion 132 to which the bottom end part of the sealing conductor 61 (i.e., the scaling via conductors 65) is connected. The connection portion 132 is formed in the main body part 130C, at intervals from the inner and outer end parts 130A and 130B. The separation structure 130 can be implemented in many ways other than in the form of a field insulation film 131.

Referring to FIG. 7, the semiconductor device 5 further includes an inorganic insulation layer 140 formed on the insulation principal surface 52 of the insulation layer 51 so as to cover the sealing conductor 61. The inorganic insulation layer 140 can be called a passivation layer. The inorganic insulation layer 140 protects the insulation layer 51 and the semiconductor chip 41 from above the insulation principal surface 52.

In the embodiment, the inorganic insulation layer 140 has a stacked structure composed of a first inorganic insulation layer 141 and a second inorganic insulation layer 142. The first inorganic insulation layer 141 can contain silicon oxide. Preferably, the first inorganic insulation layer 141 contains USG (undoped silicate glass), which is undoped silicon oxide. The first inorganic insulation layer 141 can have a thickness of 50 nm or more but 5000 nm or less. The second inorganic insulation layer 142 can contain silicon nitride. The second inorganic insulation layer 142 can have a thickness of 500 nm or more but 5000 nm or less. Increasing the total thickness of the inorganic insulation layer 140 helps increase the dielectric strength voltage above the high-potential coils 23.

In a configuration where the first inorganic insulation layer 141 is made of USG and the second inorganic insulation layer 142 is made of silicon nitride, USG has the higher dielectric breakdown voltage (V/cm) than silicon nitride. In view of this, when thickening the inorganic insulation layer 140, it is preferable to form the first inorganic insulation layer 141 thicker than the second inorganic insulation layer 142.

The first inorganic insulation layer 141 can contain at least one of BPSG (boron-doped phosphor silicate glass) and PSG (phosphorus silicate glass) as examples of silicon oxide. In that case, however, since the silicon oxide contains a dopant (boron or phosphorus), for an increased dielectric strength voltage above the high-potential coils 23, it is particularly preferable to form the first inorganic insulation layer 141 of USG. Needless to say, the inorganic insulation layer 140 can have a single-layer structure composed of either the first or second inorganic insulation layer 141 or 142.

The inorganic insulation layer 140 covers the entire area of the scaling conductor 61, and has a plurality of low-potential pad openings 143 and a plurality of high-potential pad openings 144 that are formed in a region outside the sealing conductor 61. The plurality of low-potential pad openings 143 expose the plurality of low-potential terminals 11 respectively. The plurality of high-potential pad openings 144 expose the plurality of high-potential terminals 12 respectively. The inorganic insulation layer 140 can have overlap parts that overlap circumferential edge parts of the low-potential terminals 11. The inorganic insulation layer 140 can have overlap parts that overlap circumferential edge parts of the high-potential terminals 12.

The semiconductor device 5 further includes an organic insulation layer 145 that is formed on the inorganic insulation layer 140. The organic insulation layer 145 can contain photosensitive resin. The organic insulation layer 145 can contain at least one of polyimide, polyamide, and polybenzoxazole. In the embodiment, the organic insulation layer 145 contains polyimide. The organic insulation layer 145 can have a thickness of 1 μm or more but 50 μm or less.

Preferably, the organic insulation layer 145 has a thickness larger than the total thickness of the inorganic insulation layer 140. Moreover, preferably, the inorganic and organic insulation layers 140 and 145 together have a total thickness larger than the distance D2 between the low- and high-potential coils 22 and 23. In that case, preferably, the inorganic insulation layer 140 has a total thickness of 2 μm or more but 10 μm or less. Preferably, the organic insulation layer 145 has a thickness of 5 μm or more but 50 μm or less. Such structures help suppress an increase in the thicknesses of the inorganic and organic insulation layers 140 and 145 while appropriately increasing the dielectric strength voltage above the high-potential coil 23 owing to the stacked film of the inorganic and organic insulation layers 140 and 145.

The organic insulation layer 145 includes a first part 146 that covers a low-potential side region and a second part 147 that covers a high-potential side region. The first part 146 covers the sealing conductor 61 across the inorganic insulation layer 140. The first part 146 has a plurality of low-potential terminal openings 148 through which the plurality of low-potential terminals 11 (low-potential pad openings 143) are respectively exposed in a region outside the sealing conductor 61. The first part 146 can have overlap parts that overlap circumferential edges (overlap parts) of the low-potential pad openings 143.

The second part 147 is formed at an interval from the first part 146 and exposes the inorganic insulation layer 140 between the first and second parts 146 and 147. The second part 147 has a plurality of high-potential terminal openings 149 through which the plurality of high-potential terminals 12 (high-potential pad openings 144) are respectively exposed. The second part 147 can have overlap parts that overlap circumferential edges (overlap parts) of the high-potential pad openings 144.

The second part 147 covers the transformers 21A to 21D and the dummy pattern 85 together. Specifically, the second part 147 covers the plurality of high-potential coils 23, the plurality of high-potential terminals 12, a first high-potential dummy pattern 87, a second high-potential dummy pattern 88, and a floating dummy pattern 121 together.

The present disclosure can be implemented in any other embodiments. The embodiment described above deals with an example where a first functional device 45 and a second functional device 60 are formed. An embodiment is however also possible that only has a second functional device 60, with no first functional device 45. In that case, the dummy pattern 85 may be omitted. This structure provides, with respect to the second functional device 60, effects similar to those mentioned in connection with the first embodiment (except those associated with the dummy pattern 85).

That is, in a case where a voltage is applied to the second functional device 60 via the low- and high-potential terminals 11 and 12, it is possible suppress unnecessary conduction between the high-potential terminal 12 and the sealing conductor 61. Likewise, in a case where a voltage is applied to the second functional device 60 via the low- and high-potential terminals 11 and 12, it is possible suppress unnecessary conduction between the low-potential terminal 11 and the sealing conductor 61.

The embodiment described above deals with an example where a second functional device 60 is formed. The second functional device 60 however is not essential and can be omitted.

The embodiment described above deals with an example where a dummy pattern 85 is formed. The dummy pattern 85 however is not essential and can be omitted.

The embodiment described above deals with an example where the first functional device 45 is of a multichannel type that includes a plurality of transformers 21. It is however also possible to employ a single-channel first functional device 45 that includes a single transformer 21.

<Transformer Layout>

Figure 9:
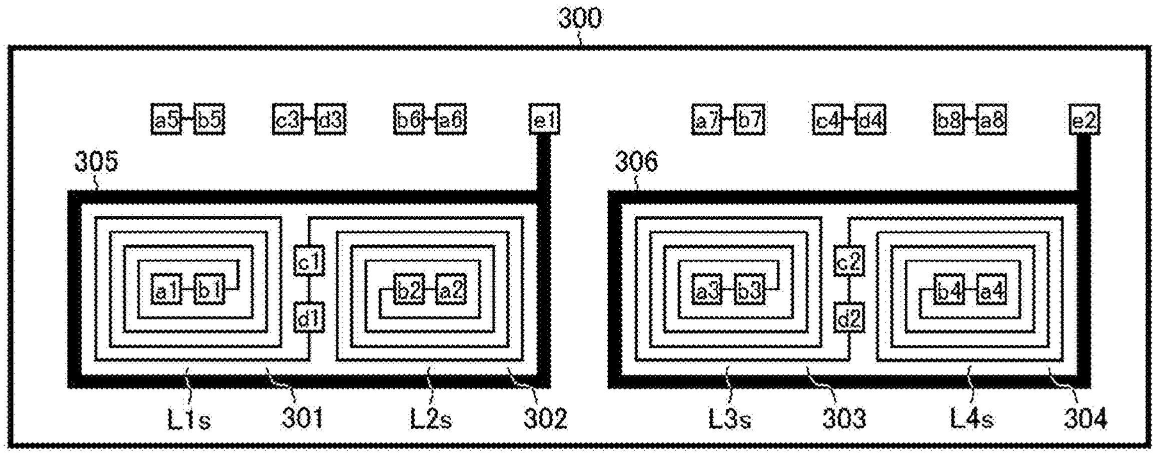
FIG. 9 is a diagram schematically showing an example of the layout of a transformer chip.

FIG. 9 is a plan view (top view) schematically showing one example of transformer layout in a two-channel transformer chip 300 (corresponding to the semiconductor device 5 described previously). The transformer chip 300 shown there includes a first transformer 301, a second transformer 302, a third transformer 303, a fourth transformer 304, a first guard ring 305, a second guard ring 306, pads a1 to a8, pads b1 to b8, pads c1 to c4, and pads d1 to d4.

In the transformer chip 300, the pads a1 and b1 are connected to one terminal of the secondary coil L1*s* of the first transformer 301, and the pads c1 and d1 are connected to the other terminal of that secondary coil L1s. The pads a2 and b2 are connected to one terminal of the secondary coil L2*s* of the second transformer 302, and the pads c1 and d1 are connected to the other terminal of that secondary coil L2*s*.

Moreover, the pads a3 and b3 are connected to one terminal of the secondary coil L3*s* of the third transformer 303, and the pads c2 and d2 are connected to the other terminal of that secondary coil L3*s*. The pads a4 and b4 are connected to one terminal of the secondary coil L4*s* of the fourth transformer 304, and the pads c2 and d2 are connected to the other terminal of that secondary coil L4*s*.

FIG. 9 does not show any of the primary coils of the first, second, third, and fourth transformers 301, 302, 303, and 304. The primary coils basically have structures similar to those of the secondary coils L1*s* to L4*s* respectively and are disposed right below the secondary coils L1*s* to L4*s*, respectively, so as to face them.

Specifically, the pads a5 and b5 are connected to one terminal of the primary coil of the first transformer 301, and the pads c3 and d3 are connected to the other terminal of that primary coil. Likewise, the pads a6 and b6 are connected to one terminal of the primary coil of the second transformer 302, and the pads c3 and d3 are connected to the other terminal of that primary coil.

Likewise, the pads a7 and b7 are connected to one terminal of the primary coil of the third transformer 303, and the pads c4 and d4 are connected to the other terminal of that primary coil. Likewise, the pads a8 and b8 are connected to one terminal of the primary coil of the fourth transformer 304, and the pads c4 and d4 are connected to the other terminal of that primary coil.

The pads a5 to a8, the pads b5 to b8, the pads c3 and c4, and the pads d3 and d4 mentioned above are each led from inside the transformer chip 300 to its surface across an unillustrated via.

Of the plurality of pads mentioned above, the pads a1 to a8 each correspond to a first current feed pad, and the pads b1 to b8 each correspond to a first voltage measurement pad;

the pads c1 to c4 each correspond to a second current feed pad, and the pads d1 to d4 each correspond to a second voltage measurement pad.

Thus, the transformer chip 300 of this configuration example permits, during its defect inspection, accurate measurement of the series resistance component across each coil. It is thus possible not only to reject defective products with a broken wire in a coil but also to appropriately reject defective products with an abnormal resistance value in a coil (e.g., a midway short circuit between coils), and hence to prevent defective products from being distributed in the market.

For a transformer chip 300 that has passed the defect inspection mentioned above, the plurality of pads described above can be used for connection with a primary-side chip and a secondary-side chip (e.g., the controller chip 210 and the driver chip 220 described previously).

Specifically, the pads a1 and b1, the pads a2 and b2, the pads a3 and b3, and the pads a4 and b4 can each be connected to one of the signal input and output terminals of the secondary-side chip; the pads c1 and d1 and the pads c2 and d2 can each be connected to a common voltage application terminal (GND2) of the secondary-side chip.

On the other hand, the pads a5 and b5, the pads a6 and b6, the pads a7 and b7, and the pads a8 and b8 can each be connected to one of the signal input and output terminals of the primary-side chip; the pads c3 and d3 and the pads c4 and d4 can each be connected to a common voltage application terminal (GND1) of the primary-side chip.

Here, as shown in FIG. 9, the first to fourth transformers 301 to 304 are so arranged as to be coupled for each signal transmission direction. In terms of what is shown in the diagram, for example, the first and second transformers 301 and 302, which transmit a signal from the primary-side chip to the secondary-side chip, are coupled into a first pair by the first guard ring 305. Likewise, for example, the third and fourth transformers 303 and 304, which transmit a signal from the secondary-side chip to the primary-side chip, are coupled into a second pair by the second guard ring 306.

Such coupling is intended, in a structure where the primary and secondary coils of each of the first to fourth transformers 301 to 304 are formed so as to be stacked on each other in the up-down direction of the substrate of the transformer chip 300, to obtain a desired withstand voltage between the primary and secondary coils. The first and second guard rings 305 and 306 are however not essential elements.

The first and second guard rings 305 and 306 can be connected via pads e1 and e2, respectively, to a low-impedance wiring such as a grounded terminal.

In the transformer chip 300, the pads c1 and d1 are shared between the secondary coils L1*s* and L2*s*. The pads c2 and d2 are shared between the secondary coils L3*s* and L4*s*. The pads c3 and d3 are shared between the primary coils L1*p* and L2*p*. The pads c4 and d4 are shared between the primary coils that correspond to them respectively. This configuration helps reduce the number of pads and helps make the transformer chip 300 compact.

Moreover, as shown in FIG. 9, the primary and secondary coils of the first to fourth transformers 301 to 304 are preferably each wound in a rectangular shape (or, with the corners rounded, in a running-track shape) as seen in a plan view of the transformer chip 300. This configuration helps increase the area over which the primary and secondary coils overlap each other and helps enhance the transmission efficiency across the transformers.

Needless to say, the illustrated transformer layout is merely an example; any number of coils of any shape can be disposed in any layout, and pads can be disposed in any layout. Any of the chip structure, transformer layouts, etc. described above can be applied to semiconductor devices in general that have a coil integrated in a semiconductor chip.

First Embodiment (Comparative Example)

Figure 10:
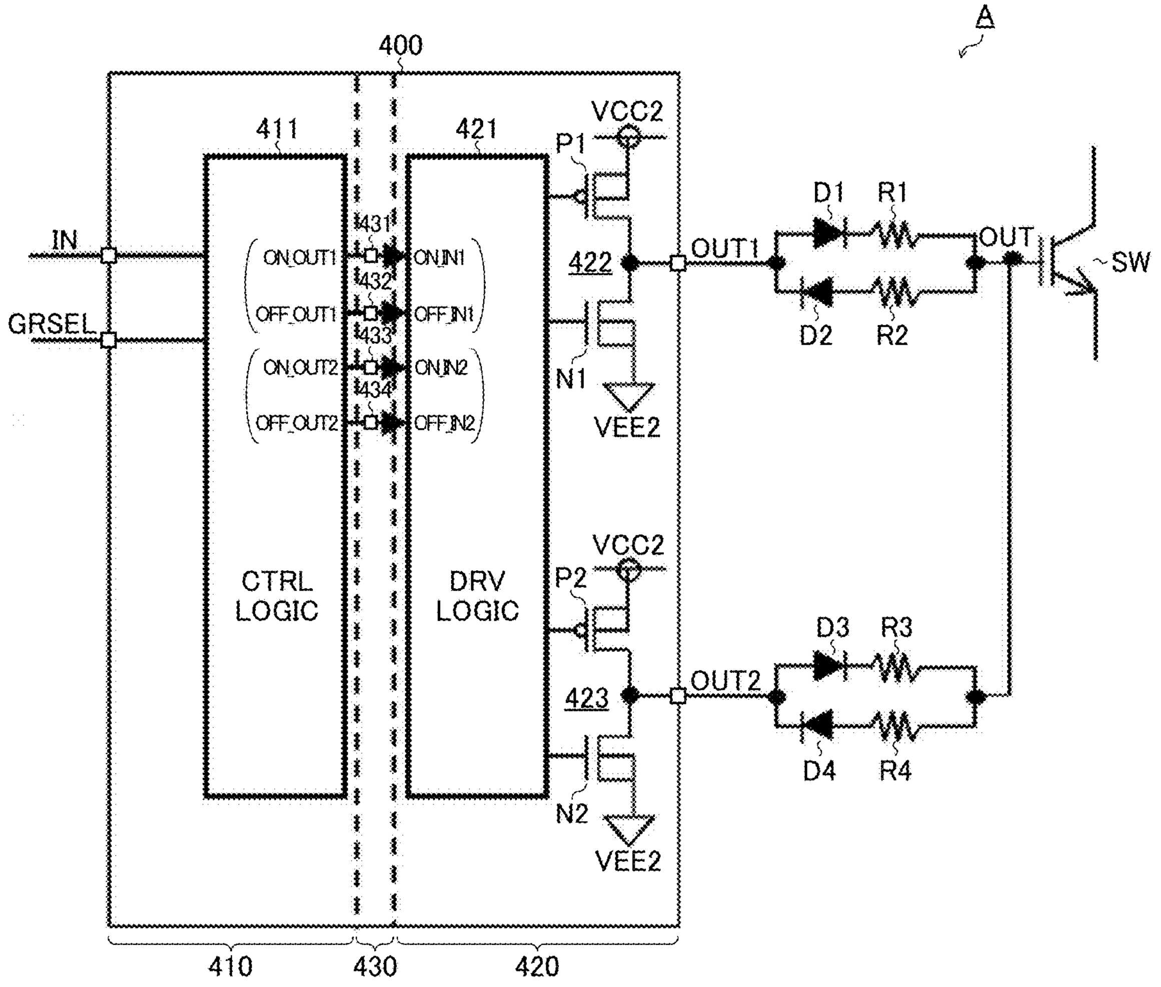
FIG. 10 is a diagram showing a first embodiment (comparative example) of a signal transmission device.

FIG. 10 is a diagram showing a first embodiment (=corresponding to a comparative example compared with a second embodiment to be described later) of a signal transmission device. The signal transmission device 400 of the present embodiment may be mounted in an electronic apparatus A together with various discrete components (e.g., a switching device SW, diodes D1 to D4, and resistors R1 to R4).

The signal transmission device 400 includes a first chip 410, a second chip 420, and a third chip 430. The first chip 410, the second chip 420, and the third chip 430 may be sealed in a single package.

Note that the signal transmission device 400 may be, like the signal transmission device 200 (FIG. 1) described previously, a semiconductor integrated circuit device (what is generally called an isolated gate driver IC) that, while isolating between input and output, generates an output pulse signal OUT according to an input pulse signal IN to drive the switching device SW.

In that case, the first chip 410 corresponds to the controller chip 210 described previously. Also, the second chip 420 corresponds to the driver chip 220 described previously. Also, the third chip 430 corresponds to the transformer chip 230 described previously.

The switching device SW may be, for example, an IGBT. Alternatively, the switching device SW may be a GaN device or a SiC device.

The first chip 410 has a first logic 411 integrated therein. The second chip 420 has a second logic 421 and output circuits 422 and 423 integrated therein. The third chip 430 has transformers 431 to 434 (each corresponding to an isolation device) integrated therein.

The first logic 411 receives an input pulse signal IN and an output selection signal GRSEL to generate a first set of transmission pulse signals ON_OUT1 and OFF_OUT1 and a second set of transmission pulse signals ON_OUT2 and OFF_OUT2.

When the output selection signal GRSEL is at high level, the first logic 411 pulse-drives either the transmission pulse signal ON_OUT1 or OFF_OUT1 according to the logic level of the input pulse signal IN. More specifically, when indicating that the input pulse signal IN is at high level, the first logic 411 pulse-drives the transmission pulse signal ON_OUT1. On the other hand, when indicating that the input pulse signal IN is at low level, the first logic 411 pulse-drives the transmission pulse signal OFF_OUT1.

Also, when the output selection signal GRSEL is at low level, the first logic 411 pulse-drives either the transmission pulse signal ON_OUT2 or OFF_OUT2 according to the logic level of the input pulse signal IN. More specifically, when indicating that the input pulse signal IN is at high level, the first logic 411 pulse-drives the transmission pulse signal ON_OUT2. On the other hand, when indicating that the input pulse signal IN is at low level, the first logic 411 pulse-drives the transmission pulse signal OFF_OUT2.

The second logic 421 receives a first set of reception pulse signals ON_IN1 and OFF_IN1 and a second set of reception pulse signals ON_IN2 and OFF_IN2 from the third chip 430 to control the output circuits 422 and 423 respectively. For example, the second logic 421 controls the output circuit 422 in response to the pulse-driving of the reception pulse signals ON_IN1 and OFF_IN1. Also, the second logic 421 controls the output circuit 423 in response to the pulse-driving of the reception pulse signals ON_IN2 and OFF_IN2.

The output circuit 422 generates a first output pulse signal OUT1 according to instructions from the second logic 421. The output circuit 422 may be, as illustrated, a half-bridge output stage including a transistor P1 (e.g., a PMOSFET [P-channel type metal oxide semiconductor field effect transistor]) and a transistor N1 (e.g., an NMOSFET [N-channel type MOSFET]).

Regarding the connection relationship, the source of the transistor P1 is connected to the application terminal of a supply voltage VCC2. The source of the transistor N1 is connected to the application terminal of a reference voltage VEE2. The drains of the transistors P1 and N1 are both connected to the application terminal of a first output pulse signal OUT1. The application terminal of the first output pulse signal OUT1 is connected to the anode of the diode D1 and the cathode of the diode D2. The cathode of the diode D1 is connected to a first terminal of the resistor R1. The anode of the diode D2 is connected to a first terminal of the resistor R2. The second terminals of the resistors R1 and R2 are both connected to a control terminal (=output pulse signal OUT application terminal) of the switching device SW.

When the transistor P1 is in the ON state and the transistor N1 is in the OFF state, the first output pulse signal OUT1 is at high level (~ VCC2). Therefore, current flows from the application terminal of the supply voltage VCC2 through the transistor P1, the diode D1, and the resistor R1 toward the control terminal of the switching device SW. As a result, the output pulse signal OUT is at high level, so the switching device SW is in the ON state. That is, the high level of the first output pulse signal OUT1 may be understood as the logic level during the ON state of the switching device SW. At this time, the slope (=ON-time slew rate) at which the output pulse signal OUT rises from low level to high level may be arbitrarily adjusted by the resistance value of the resistor R1.

On the other hand, when the transistor P1 is in the OFF state and the transistor N1 is in the ON state, the first output pulse signal OUT1 is at low level (≈VEE2). Therefore, current flows from the control terminal of the switching device SW through the resistor R2, the diode D2, and the transistor N1 toward the application terminal of the reference voltage VEE2. As a result, the output pulse signal OUT is at low level, so the switching device SW is in the OFF state. That is, the low level of the first output pulse signal OUT1 may be understood as the logic level during the OFF state of the switching device SW. At this time, the slope (=OFF-time slew rate) at which the output pulse signal OUT falls from high level to low level may be arbitrarily adjusted by the resistance value of the resistor R2.

Note that the drains of the transistors P1 and N1 may be independently drawn out to the outside of the signal transmission device 400. That is, the drain of the transistor P1 may be individually connected to the first terminal of the resistor R1, and the drain of the transistor N1 may be individually connected to the first terminal of the resistor R2. With such a configuration, the diodes D1 and D2 may be omitted.

The output circuit 423 generates a second output pulse signal OUT2 according to instructions from the second logic 421. The output circuit 423 may be, as illustrated, a half-bridge output stage including a transistor P2 (e.g., a PMOSFET) and a transistor N2 (e.g., an NMOSFET).

Regarding the connection relationship, the source of the transistor P2 is connected to the application terminal of the supply voltage VCC2. The source of the transistor N2 is connected to the application terminal of the reference voltage VEE2. The drains of the transistors P2 and N2 are both connected to the application terminal of a second output pulse signal OUT2. The application terminal of the second output pulse signal OUT2 is connected to the anode of the diode D3 and the cathode of the diode D4. The cathode of the diode D3 is connected to a first terminal of the resistor R3. The anode of the diode D4 is connected to a first terminal of the resistor R4. The second terminals of the resistors R3 and R4 are both connected to the control terminal (=the application terminal of the output pulse signal OUT) of the switching device SW.

When the transistor P2 is in the ON state and the transistor N2 is in the OFF state, the second output pulse signal OUT2 is at high level (~ VCC2). Therefore, current flows from the application terminal of the supply voltage VCC2 through the transistor P2, the diode D3, and the resistor R3 toward the control terminal of the switching device SW. As a result, the output pulse signal OUT is at high level, so the switching device SW is in the ON state. That is, the high level of the second output pulse signal OUT2 may be understood as the logic level during the ON state of the switching device SW. At this time, the slope (=ON-time slew rate) at which the output pulse signal OUT rises from low level to high level may be arbitrarily adjusted by the resistance value of the resistor R3.

On the other hand, when the transistor P2 is in the OFF state and the transistor N2 is in the ON state, the second output pulse signal OUT2 is at low level (≈VEE2). Therefore, current flows from the control terminal of the switching device SW through the resistor R4, the diode D4, and the transistor N2 toward the application terminal of the reference voltage VEE2. As a result, the output pulse signal OUT is at low level, so the switching device SW is in the OFF state. That is, the low level of the second output pulse signal OUT2 may be understood as the logic level during the OFF state of the switching device SW. At this time, the slope (=OFF-time slew rate) at which the output pulse signal OUT falls from high level to low level may be arbitrarily adjusted by the resistance value of the resistor R4.

Note that the drains of the transistors P2 and N2 may be independently drawn out to the outside of the signal transmission device 400. That is, the drain of the transistor P2 may be individually connected to the first terminal of the resistor R3, and the drain of the transistor N2 may be individually connected to the first terminal of the resistor R4. With such a configuration, the diodes D3 and D4 may be omitted.

The transformers 431 to 434, while isolating the first logic 411 from the second logic 421 on a direct-current basis, output the first set of transmission pulse signals ON_OUT1 and OFF_OUT1 and the second set of transmission pulse signals ON_OUT2 and OFF_OUT2 input from the first logic 411 as the first set of reception pulse signals ON_IN1 and OFF_IN1 and the second set of reception pulse signals ON_IN2 and OFF_IN2 to the second logic 421.

For example, when the output selection signal GRSEL is at high level, the input pulse signal IN is split into the transmission pulse signals ON_OUT1 and OFF_OUT1, and then isolated and transmitted from the first logic 411 to the second logic 421 via the transformers 431 and 432. On the other hand, when the output selection signal GRSEL is at low level, the input pulse signal IN is split into the transmission pulse signals ON_OUT2 and OFF_OUT2 and then isolated and transmitted from the first logic 411 to the second logic 421 via the transformers 433 and 434.

Note that in the present description, the reception pulse signal ON_IN1 corresponds to a first signal (ON signal) of the first set. The reception pulse signal OFF_IN1 corresponds to a second signal (OFF signal) of the first set. The reception pulse signal ON_IN2 corresponds to a first signal (ON signal) of the second set. The reception pulse signal OFF_IN2 corresponds to a second signal (OFF signal) of the second set.

Figure 11:
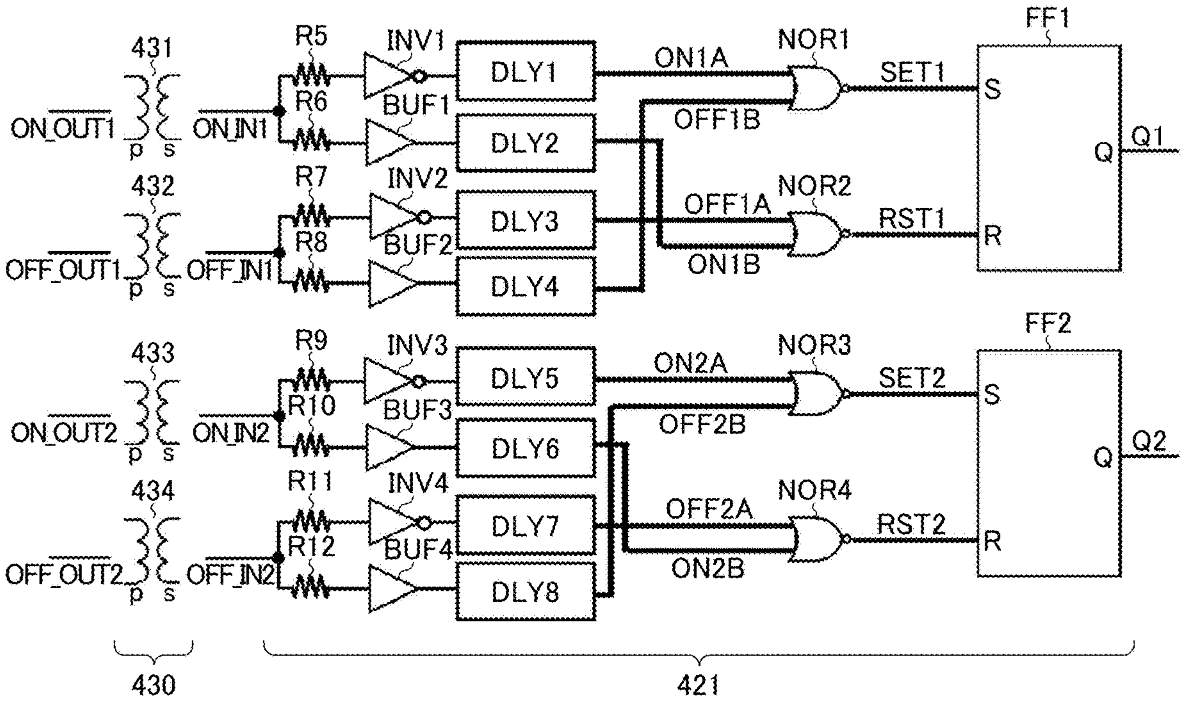
FIG. 11 is a diagram showing an example of a second logic in the first embodiment.

FIG. 11 is a diagram showing an example of the second logic 421 in the first embodiment. As shown in this figure, the second logic 421 includes resistors R5 to R12, inverters INV1 to INV4, buffers BUF1 to BUF4, delay circuits DLY1 to DLY8, NOR gates NOR1 to NOR4, and RS flip-flops FF1 and FF2. Also shown in this figure are the transformers 431 to 434 connected to the second logic 421.

The transformer 431 outputs a reception pulse signal ON_IN1 from the secondary coil 431*s* according to the transmission pulse signal ON_OUT1 input to the primary coil 431*p*. The transformer 432 outputs a reception pulse signal OFF_IN1 from the secondary coil 432*s* according to the transmission pulse signal OFF_OUT1 input to the primary coil 432*p*. The transformer 433 outputs a reception pulse signal ON_IN2 from the secondary coil 433*s* according to the transmission pulse signal ON_OUT2 input to the primary coil 433*p*. The transformer 434 outputs a reception pulse signal OFF_IN2 from the secondary coil 434*s* according to the transmission pulse signal OFF_OUT2 input to the primary coil 434*p*.

The resistor R5 is connected between the application terminal of the reception pulse signal ON_IN1 and the input terminal of the inverter INV1. The resistor R6 is connected between the application terminal of the reception pulse signal ON_IN1 and the input terminal of the buffer BUF1. The resistor R7 is connected between the application terminal of the reception pulse signal OFF_IN1 and the input terminal of the inverter INV2. The resistor R8 is connected between the application terminal of the reception pulse signal OFF_IN1 and the input terminal of the buffer BUF2.

The resistor R9 is connected between the application terminal of the reception pulse signal ON_IN2 and the input terminal of the inverter INV3. The resistor R10 is connected between the application terminal of the reception pulse signal ON_IN2 and the input terminal of the buffer BUF3. The resistor R11 is connected between the application terminal of the reception pulse signal OFF_IN2 and the input terminal of the inverter INV4. The resistor R12 is connected between the application terminal of the reception pulse signal OFF_IN2 and the input terminal of the buffer BUF4.

The inverter INV1 inverts the logic level of the reception pulse signal ON_IN1 and outputs the result. The inverter INV2 inverts the logic level of the reception pulse signal OFF_IN1 and outputs the result. The inverter INV3 inverts the logic level of the reception pulse signal ON_IN2 and outputs the result. The inverter INV4 inverts the logic level of the reception pulse signal OFF_IN2 and outputs the result.

The buffer BUF1 maintains the logic level of the reception pulse signal ON_IN1 and outputs the result. The buffer BUF2 maintains the logic level of the reception pulse signal OFF_IN1 and outputs the result. The buffer BUF3 maintains the logic level of the reception pulse signal ON_IN2 and outputs the result. The buffer BUF4 maintains the logic level of the reception pulse signal OFF_IN2 and outputs the result.

The threshold voltage VthH of each of the inverters INV1 to INV4 may be set to a higher voltage value than the threshold voltage VthL of each of the buffers BUF1 to BUF4. For example, VthH may be 0.80V. Also, VthL may be 0.70V.

The delay circuit DLY1 generates a main signal ON1A from the output signal of the inverter INV1. The delay circuit DLY2 generates a sub-signal ON1B from the output signal of the buffer BUF1. The delay circuit DLY3 generates a main signal OFF1A from the output signal of the inverter INV2. The delay circuit DLY4 generates a sub-signal OFF1B from the output signal of the buffer BUF2. The main signal ON1A, the sub-signal ON1B, the main signal OFF1A, and the sub-signal OFF1B will be described in detail later.

The delay circuit DLY5 generates a main signal ON2A from the output signal of the inverter INV3. The delay circuit DLY6 generates a sub-signal ON2B from the output signal of the buffer BUF3. The delay circuit DLY7 generates a main signal OFF2A from the output signal of the inverter INV4. The delay circuit DLY8 generates a sub-signal OFF2B from the output signal of the buffer BUF4. The main signal ON2A, the sub-signal ON2B, the main signal OFF2A, and the sub-signal OFF2B will be described in detail later.

The NOR gate NOR1 generates a set signal SET1 by performing a NOR operation on the main signal ON1A and the sub-signal OFF1B. Therefore, the set signal SET1 goes to low level when at least one of the main signals ON1A and the sub-signal OFF1B is at high level. On the other hand, the set signal SET1 goes to high level when both the main signal ON1A and the sub-signal OFF1B are at low level.

The NOR gate NOR2 generates a reset signal RST1 by performing a NOR operation on the main signal OFF1A and the sub-signal ON1B. Therefore, the reset signal RST1 goes to low level when at least one of the main signals OFF1A and the sub-signal ON1B is at high level. On the other hand, the reset signal RST1 goes to high level when both the main signal OFF1A and the sub-signal ON1B are at low level.

The NOR gate NOR3 generates a set signal SET2 by performing a NOR operation on the main signal ON2A and the sub-signal OFF2B. Therefore, the set signal SET2 goes to low level when at least one of the main signals ON2A and the sub-signal OFF2B is at high level. On the other hand, the set signal SET2 goes to high level when both the main signal ON2A and the sub-signal OFF2B are at low level.

The NOR gate NOR4 generates a reset signal RST2 by performing a NOR operation on the main signal OFF2A and the sub-signal ON2B. Therefore, the reset signal RST2 goes to low level when at least one of the main signals OFF2A and the sub-signal ON2B is at high level. On the other hand, the reset signal RST2 goes to high level when both the main signal OFF2A and the sub-signal ON2B are at low level.

The RS flip-flop FF1 generates a latch output signal Q1 according to the set signal SET1 and the reset signal RST1. For example, the RS flip-flop FF1 sets the latch output signal Q1 to high level at the timing when the set signal SET1 rises to high level. On the other hand, the RS flip-flop FF1 resets the latch output signal Q1 to low level at the timing when the reset signal RST1 rises to high level.

The RS flip-flop FF2 generates a latch output signal Q2 according to the set signal SET2 and the reset signal RST2. For example, the RS flip-flop FF2 sets the latch output signal Q2 to high level at the timing when the set signal SET2 rises to high level. On the other hand, the RS flip-flop FF2 resets the latch output signal Q2 to low level at the timing when the reset signal RST2 rises to high level.

FIG. 12 is a diagram showing an example of output control in the first embodiment. This figure shows the relationship between the pulse generation states of the main signals ON1A, OFF1A, ON2A, and OFF2A and the output state of the signal transmission device 400.

First, consider a case where the second logic 421 receives the reception pulse signal ON_IN1 while not receiving any of the other reception pulse signals OFF_IN1, ON_IN2, and OFF_IN2. In this case, as shown in the first row of this figure, a pulse is generated in the main signal ON1A, and no pulse is generated in the main signals OFF1A, ON2A, and OFF2A. Therefore, the set signal SET1 rises to high level, so the latch output signal Q1 is set to high level. At this time, the output circuit 422 makes the first output pulse signal OUT1 high level by turning ON the transistor P1 and turning OFF the transistor N1. On the other hand, the output circuit 423 makes the second output pulse signal OUT2 in a high-impedance output state by turning OFF both the transistors P2 and N2.

Next, consider a case where the second logic 421 receives the reception pulse signal OFF_IN1 while not receiving any of the other reception pulse signals ON_IN1, ON_IN2, and OFF_IN2. In this case, as shown in the second row of this figure, a pulse is generated in the main signal OFF1A, and no pulse is generated in the main signals ON1A, ON2A, and OFF2A. Therefore, the reset signal RST1 rises to high level, so the latch output signal Q1 is reset to low level. At this time, the output circuit 422 makes the first output pulse signal OUT1 low level by turning OFF the transistor P1 and turning ON the transistor N1. On the other hand, the output circuit 423 makes the second output pulse signal OUT2 in a high-impedance output state by turning OFF both the transistors P2 and N2.

Next, consider a case where the second logic 421 receives the reception pulse signal ON_IN2 while not receiving any of the other reception pulse signals ON_IN1, OFF_IN1, and OFF_IN2. In this case, as shown in the third row of this figure, a pulse is generated in the main signal ON2A, and no pulse is generated in the main signals ON1A, OFF1A, and OFF2A. Therefore, the set signal SET2 rises to high level, so the latch output signal Q2 is set to high level. At this time, the output circuit 423 makes the second output pulse signal OUT2 high level by turning ON the transistor P2 and turning OFF the transistor N2. On the other hand, the output circuit 422 makes the first output pulse signal OUT1 in a high-impedance output state by turning OFF both the transistors P1 and N1.

Next, consider a case where the second logic 421 receives the reception pulse signal OFF_IN2 while not receiving any of the other reception pulse signals ON_IN1, OFF_IN1, and ON_IN2. In this case, as shown in the fourth row of this figure, a pulse is generated in the main signal OFF2A, and no pulse is generated in the main signals ON1A, OFF1A, and ON2A. Therefore, the reset signal RST2 rises to high level, so the latch output signal Q2 is reset to low level. At this time, the output circuit 423 makes the second output pulse signal OUT2 low level by turning OFF the transistor P2 and turning ON the transistor N2. On the other hand, the output circuit 422 makes the first output pulse signal OUT1 in a high-impedance output state by turning OFF both the transistors P1 and N1.

Next, consider a case where the second logic 421 simultaneously receives the reception pulse signals ON_IN1 and OFF_IN1. In this case, as shown in the fifth row of this figure, pulses are generated in both the main signals ON1A and OFF1A. However, due to the CMTI noise canceling to be described later, both the set signal SET1 and the reset signal RST1 are maintained at low level.

Next, consider a case where the second logic 421 simultaneously receives the reception pulse signals ON_IN2 and OFF_IN2. In this case, as shown in the sixth row of this figure, pulses are generated in both the main signals ON2A and OFF2A. However, due to the CMTI noise canceling to be described later, both the set signal SET2 and the reset signal RST2 are maintained at low level.

By the way, when a pulse driving signal for turning ON/OFF the switching device SW is transmitted, the reception pulse signals ON_IN1, OFF_IN1, ON_IN2, and OFF_IN2 can basically be pulse-driven in a single phase for only one of them. On the other hand, CMTI noise may be superimposed in the same phase on all the reception pulse signals ON_IN1, OFF_IN1, ON_IN2, and OFF_IN2. CMTI noise canceling is implemented using this difference in characteristics.

Figure 13:
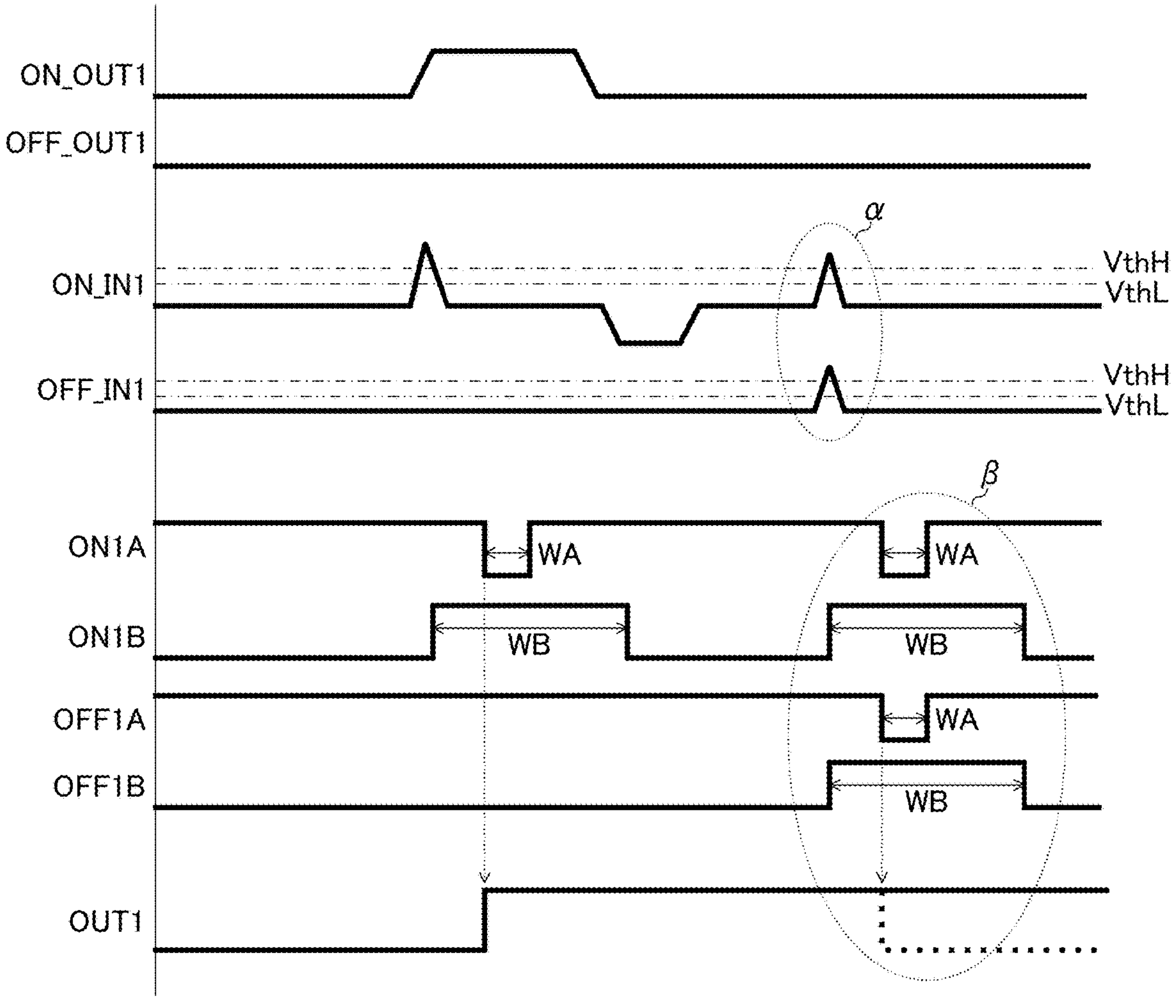
FIG. 13 is a diagram showing an example of CMTI [common mode transient immunity] noise canceling.

FIG. 13 is a diagram showing an example of CMTI noise canceling. This figure shows, from top to bottom, the transmission pulse signals ON_OUT1 and OFF_OUT1, the reception pulse signals ON_IN1 and OFF_IN1, the main signal ON1A, the sub-signal ON1B, the main signal OFF1A, the sub-signal OFF1B, and the first output pulse signal OUT1.

First, the behavior when CMTI noise is not superimposed (at the time of transmitting the transmission pulse signal ON_OUT1 in this figure) is explained. When a pulse is generated in the transmission pulse signal ON_OUT1, a pulse is also induced in the reception pulse signal ON_IN1 via the transformer 431.

At this time, the main signal ON1A falls to low level after a predetermined delay time has elapsed from when the reception pulse signal ON_IN1 exceeds the threshold voltage VthH. Also, the main signal ON1A is maintained at low level for a pulse width WA and then rises to high level again. On the other hand, the sub-signal ON1B rises to high level without delay at the time when the reception pulse signal ON_IN1 exceeds the threshold voltage VthL. Also, the sub-signal ON1B is maintained at high level for a pulse width WB and then falls to low level again.

Since no pulse is generated in the transmission pulse signal OFF_OUT1, the sub-signal OFF1B is maintained at low level. Therefore, at the time when the main signal ON1A falls to low level, the set signal SET1 (not shown) rises to high level, and consequently, the latch output signal Q1 (not shown) is set to high level. As a result, the first output pulse signal OUT1 is raised to high level. In this way, when CMTI noise is not superimposed, the main signal ON1A is not masked by the sub-signal OFF1B.

Next, the behavior when CMTI noise is superimposed is explained. As shown in the dashed frame α in this figure, CMTI noise is superimposed in the same phase on both the reception pulse signals ON_IN1 and OFF_IN1.

At this time, the main signals ON1A and OFF1A each fall to low level after a predetermined delay time has elapsed from when the reception pulse signals ON_IN1 and OFF_IN1 exceed the threshold voltage VthH, respectively. Also, the main signals ON1A and OFF1A are each maintained at low level for a pulse width WA and then rise to high level again. On the other hand, the sub-signals ON1B and OFF1B each rise to high level without delay at the time when the reception pulse signals ON_IN1 and OFF_IN1 exceed the threshold voltage VthL, respectively. Also, the sub-signals ON1B and OFF1B are each maintained at high level for a pulse width WB and then fall to low level again.

Here, as shown in the dashed frame β in this figure, the high-level period of the sub-signal ON1B encompasses the low-level period of the main signal OFF1A. In other words, when the main signal OFF1A is at low level, the sub-signal ON1B is always at high level. Therefore, even if the main signal OFF1A falls to low level, the reset signal RST1 (not shown) does not risc to high level, and consequently, the latch output signal Q1 (not shown) is not reset to low level.

In this way, when CMTI noise is superimposed, the main signal OFF1A is masked by the sub-signal ON1B. Therefore, even if CMTI noise is superimposed when the first output pulse signal OUT1 is at high level, the first output pulse signal OUT1 will not unintentionally fall to low level.

Also, as shown in the dashed frame β in this figure, when CMTI noise is superimposed, the main signal ON1A is masked by the sub-signal OFF1B. Therefore, even if CMTI noise is superimposed when the first output pulse signal OUT1 is at low level, the first output pulse signal OUT1 will not unintentionally rise to high level.

Also, in this figure, similar CMTI noise canceling may be implemented for the second output pulse signal OUT2. In that case, the transmission pulse signals ON_OUT1 and OFF_OUT1, the reception pulse signals ON_IN1 and OFF_IN1, the main signal ON1A, the sub-signal ON1B, the main signal OFF1A, the sub-signal OFF1B, and the first output pulse signal OUT1 in this figure can be read as the transmission pulse signals ON_OUT2 and OFF_OUT2, the reception pulse signals ON_IN2 and OFF_IN2, the main signal ON2A, the sub-signal ON2B, the main signal OFF2A, the sub-signal OFF2B, and the second output pulse signal OUT2, respectively.

<Considerations on Reducing Isolation Devices>

By the way, the signal transmission device 400 of the first embodiment pulse-drives one of the transformers 431 to 434 in a single phase according to the logic levels of the input pulse signal IN and the output selection signal GRSEL.

For example, referring to FIG. 12 described above, the transformer 431 is pulse-driven in a single phase when making the first output state (OUT1=H, OUT2=Hi-Z). The transformer 432 is pulse-driven in a single phase when making the second output state (OUT1=L, OUT2=Hi-Z). The transformer 433 is pulse-driven in a single phase when making the third output state (OUT1=Hi-Z, OUT2=H). The transformer 434 is pulse-driven in a single phase when making the fourth output state (OUT1=Hi-Z, OUT2=L).

Therefore, if it is necessary to provide the signal transmission device 400 with output states other than those described above, for example, a fifth output state (OUT1=OUT2=H) and a sixth output state (OUT1=OUT2=L), transformers must be added to the third chip 430. Also, not only when increasing the output states of the signal transmission device 400, but also when switching the operation mode of the signal transmission device 400, it may be necessary to add transformers.

In view of the above considerations, a second embodiment is proposed below that can increase the output states of the signal transmission device 400 or switch the operation mode of the signal transmission device 400 without requiring the addition of transformers.

<Second Embodiment>

Figure 14:
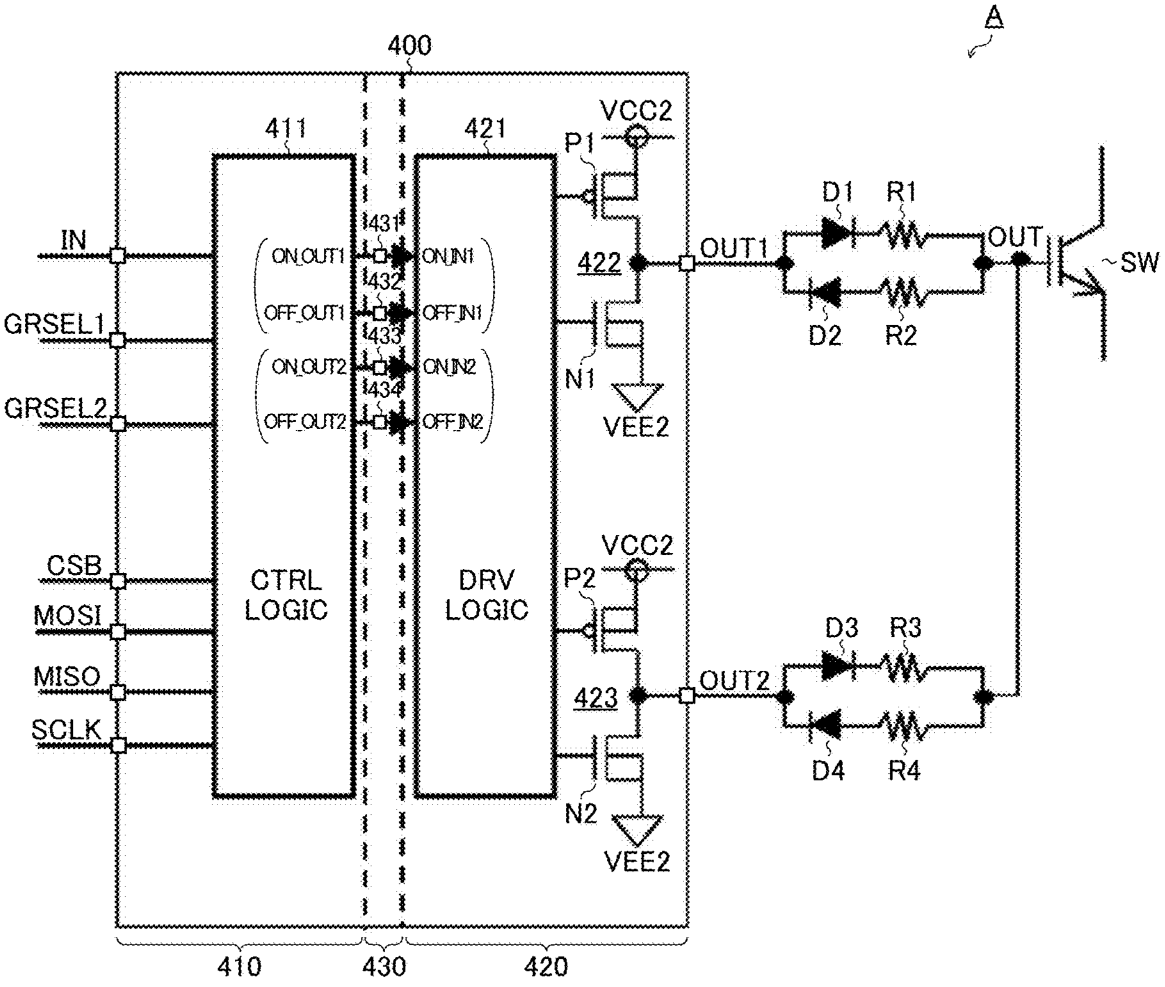
FIG. 14 is a diagram showing a second embodiment of the signal transmission device.

FIG. 14 is a diagram showing a second embodiment of the signal transmission device 400. The signal transmission device 400 of the present embodiment is based on the first embodiment (FIG. 10) and can assume the first to sixth output states according to the output selection signals GRSEL1 and GRSEL2.

For example, when (GRSEL1, GRSEL2)=(H, L), the signal transmission device 400 assumes either the first output state (OUT1=H, OUT2=Hi-Z) or the second output state (OUT1=L, OUT2=Hi-Z) according to the input pulse signal IN. Also, for example, when (GRSEL1, GRSEL2)=(L, H), the signal transmission device 400 assumes either the third output state (OUT1=Hi-Z, OUT2=H) or the fourth output state (OUT1=Hi-Z, OUT2=L) according to the input pulse signal IN.

Also, for example, when (GRSEL1, GRSEL2)=(H, H), the signal transmission device 400 assumes the fifth output state (OUT1=OUT2=H) regardless of the input pulse signal IN. Also, for example, when (GRSEL1, GRSEL2)=(L, L), the signal transmission device 400 assumes the sixth output state (OUT1=OUT2=L) regardless of the input pulse signal IN.

Furthermore, the signal transmission device 400 has, in addition to the main isolated communication function (IN→OUT), a serial communication function with the outside of the device, and a chip-to-chip serial communication function between the first chip 410 and the second chip 420.

For example, the first logic 411 performs serial communication with a master (not shown) provided outside the device, in accordance with a predetermined communication protocol. Referring to this figure, the first logic 411 transmits and receives a chip select signal CSB, an input data signal MOSI, an output data signal MISO, and a clock signal SCLK in accordance with the SPI [serial peripheral interface] communication protocol. However, the communication protocol is not limited to this.

Also, the first logic 411 switches the operation mode of the signal transmission device 400 between a PWM [pulse width modulation] mode and an SPI communication mode according to the serial communication with the outside of the device. The first logic 411 may switch the operation mode of the signal transmission device 400 from the PWM mode to the SP1 communication mode when the chip select signal CSB is at low level (=the logic level at the time of chip selection). Also, the first logic 411 may switch the operation mode of the signal transmission device 400 from the SPI communication mode to the PWM mode when it detects a communication end command (or communication end flag) included in the input data signal MOSI.

Note that in the PWM mode, the input pulse signal IN is isolated and transmitted as the output pulse signal OUT via the transformers 431 to 434. On the other hand, in the SP1 communication mode, bidirectional serial communication is performed between the first logic 411 and the second logic 421 via the transformers 431 to 434 (details to be described later).

In particular, in the signal transmission device 400 of the second embodiment, ingenuity is applied to each of the first logic 411 and the second logic 421 to achieve the above operations without increasing the transformers 431 to 434.

Specifically, the first logic 411 is capable of simultaneously transmitting a plurality of combinations of signals from different sets among the first set of transmission pulse signals ON_OUT1 and OFF_OUT1 and the second set of transmission pulse signals ON_OUT2 and OFF_OUT2 (details to be described later).

Also, the second logic 421 performs operations according to the combination of signals received via the transformers 431 to 434 from among the first set of reception pulse signals ON_IN1 and OFF_IN1 and the second set of reception pulse signals ON_IN2 and OFF_IN2 (details to be described later).

Figure 15:
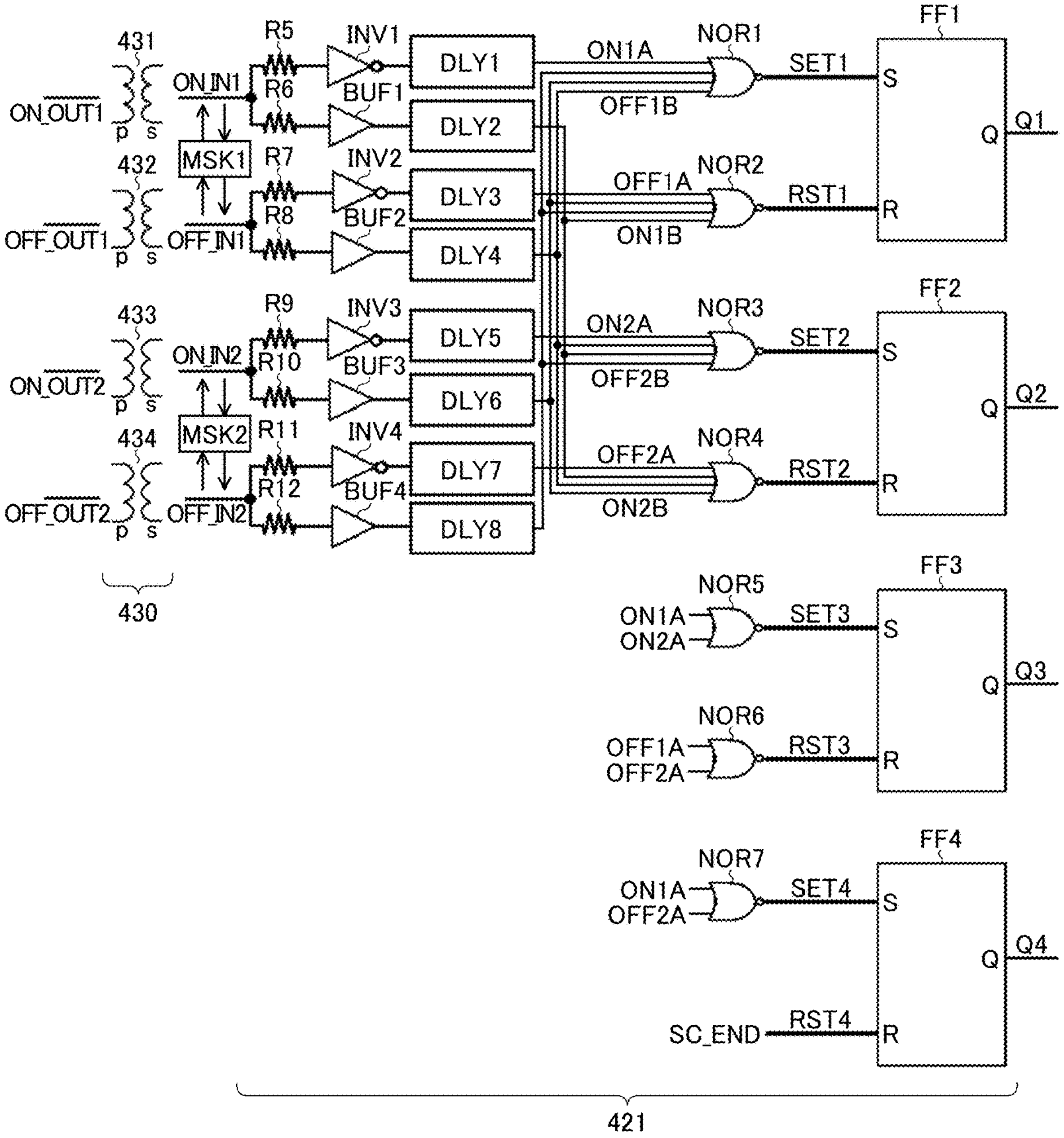
FIG. 15 is a diagram showing an example of the second logic in the second embodiment.

FIG. 15 is a diagram showing an example of the second logic 421 in the second embodiment. The second logic 421 of this configuration example is based on FIG. 11 and further includes NOR gates NOR5 to NOR7, RS flip-flops FF3 and FF4, and mask circuits MSK1 and MSK2. Also, changes have been made to the input signals of each of the NOR gates NOR1 to NOR4. In the following, redundant explanations of components that have already been described will be omitted, and the points of change from FIG. 11 will be described in detail.

The NOR gate NOR1 generates a set signal SET1 by performing a NOR operation on not only the main signal ON1A and the sub-signal OFF1B but also the newly input sub-signals ON2B and OFF2B, a total of four signals. Therefore, the set signal SET1 goes to low level when at least one of the main signal ON1A, the sub-signals OFF1B, ON2B, and OFF2B is at high level. On the other hand, the set signal SET1 goes to high level when all of the main signal ON1A, the sub-signals OFF1B, ON2B, and OFF2B are at low level.

The NOR gate NOR2 generates a reset signal RST1 by performing a NOR operation on not only the main signal OFF1A and the sub-signal ON1B but also the newly input sub-signals ON2B and OFF2B, a total of four signals. Therefore, the reset signal RST1 goes to low level when at least one of the main signals OFF1A, the sub-signals ON1B, ON2B, and OFF2B is at high level. On the other hand, the reset signal RST1 goes to high level when all of the main signal OFF1A, the sub-signals ON1B, ON2B, and OFF2B are at low level.

The NOR gate NOR3 generates a set signal SET2 by performing a NOR operation on not only the main signal ON2A and the sub-signal OFF2B but also the newly input sub-signals ON1B and OFF1B, a total of four signals. Therefore, the set signal SET2 goes to low level when at least one of the main signals ON2A, the sub-signals OFF2B, ON1B, and OFF1B is at high level. On the other hand, the set signal SET2 goes to high level when all of the main signal ON2A, the sub-signals OFF2B, ON1B, and OFF1B are at low level.

The NOR gate NOR4 generates a reset signal RST2 by performing a NOR operation on not only the main signal OFF2A and the sub-signal ON2B but also the newly input sub-signals ON1B and OFF1B, a total of four signals. Therefore, the reset signal RST2 goes to low level when at least one of the main signals OFF2A, the sub-signals ON2B, ON1B, and OFF1B is at high level. On the other hand, the reset signal RST2 goes to high level when all of the main signal OFF2A, the sub-signals ON2B, ON1B, and OFF1B are at low level.

The NOR gate NOR5 generates a set signal SET3 by performing a NOR operation on the main signals ON1A and ON2A. Therefore, the set signal SET3 goes to low level when at least one of the main signals ON1A and ON2A is at high level. On the other hand, the set signal SET3 goes to high level when both of the main signals ON1A and ON2A are at low level.

The NOR gate NOR6 generates a reset signal RST3 by performing a NOR operation on the main signals OFF1A and OFF2A. Therefore, the reset signal RST3 goes to low level when at least one of the main signals OFF1A and OFF2A is at high level. On the other hand, the reset signal RST3 goes to high level when both of the main signals OFF1A and OFF2A are at low level.

The NOR gate NOR7 generates a set signal SET4 by performing a NOR operation on the main signals ON1A and OFF2A. Therefore, the set signal SET4 goes to low level when at least one of the main signals ON1A and OFF2A is at high level. On the other hand, the set signal SET4 goes to high level when both of the main signals ON1A and OFF2A are at low level. Note that instead of the main signals ON1A and OFF2A, the main signals OFF1A and ON2A may be input to the NOR gate NOR7.

The RS flip-flop FF3 generates a latch output signal Q3 according to the set signal SET3 and the reset signal RST3. For example, the RS flip-flop FF3 sets the latch output signal Q3 to high level at the timing when the set signal SET3 rises to high level. On the other hand, the RS flip-flop FF3 resets the latch output signal Q3 to low level at the timing when the reset signal RST3 rises to high level.

The RS flip-flop FF4 generates a latch output signal Q4 according to the set signal SET4 and the reset signal RST4. For example, the RS flip-flop FF4 sets the latch output signal Q4 to high level at the timing when the set signal SET4 rises to high level. On the other hand, the RS flip-flop FF4 resets the latch output signal Q4 to low level at the timing when the reset signal RST4 rises to high level. Note that as the reset signal RST4, for example, a serial communication end signal SC_END that goes to high level at the end of serial communication may be input.

The mask circuit MSK1 masks (e.g., fixes to low level) the reception pulse signal OFF_IN1 when a pulse occurs in the reception pulse signal ON_IN1. Also, the mask circuit MSK1 masks (e.g., fixes to low level) the reception pulse signal ON_IN1 when a pulse occurs in the reception pulse signal OFF_IN1.

The mask circuit MSK2 masks (e.g., fixes to low level) the reception pulse signal OFF_IN2 when a pulse occurs in the reception pulse signal ON_IN2. Also, the mask circuit MSK2 masks (e.g., fixes to low level) the reception pulse signal ON_IN2 when a pulse occurs in the reception pulse signal OFF_IN2.

FIG. 16 is a diagram showing an example of output control in the second embodiment. This figure shows, like FIG. 12 described previously, the relationship between the pulse generation states of the main signals ON1A, OFF1A, ON2A, and OFF2A and the output state of the signal transmission device 400. In the following, redundant explanations of operational states that have already been described will be omitted, and the points of change from FIG. 12 (the seventh to tenth rows enclosed in bold frames) will be described in detail.

First, consider a case where the second logic 421 simultaneously receives the reception pulse signals ON_IN1 and ON_IN2. In this case, as shown in the seventh row of this figure, pulses are generated in both the main signals ON1A and ON2A. Therefore, the set signal SET3 rises to high level, so the latch output signal Q3 is set to high level. At this time, the output circuit 422 makes the first output pulse signal OUT1 high level by turning ON the transistor P1 and turning OFF the transistor N1. Also, the output circuit 423 makes the second output pulse signal OUT2 high level by turning ON the transistor P2 and turning OFF the transistor N2.

Note that when the reception pulse signals ON_IN1 and ON_IN2 are simultaneously received, not only are pulses generated in both the main signals ON1A and ON2A, but pulses are also generated in both the sub-signals ON1B and ON2B. The sub-signal ON2B is input to the NOR gates NOR1 and NOR2. Therefore, the set signal SET1 and the reset signal RST1 are maintained at low level. Also, the sub-signal ON1B is input to the NOR gates NOR3 and NOR4. Therefore, the set signal SET2 and the reset signal RST2 are also maintained at low level.

Next, consider a case where the second logic 421 simultaneously receives the reception pulse signals OFF_IN1 and OFF_IN2. In this case, as shown in the eighth row of this figure, pulses are generated in both the main signals OFF1A and OFF2A. Therefore, the reset signal RST3 rises to high level, so the latch output signal Q3 is reset to low level. At this time, the output circuit 422 makes the first output pulse signal OUT1 low level by turning OFF the transistor P1 and turning ON the transistor N1. Also, the output circuit 423 makes the second output pulse signal OUT2 low level by turning OFF the transistor P2 and turning ON the transistor N2.

Note that when the reception pulse signals OFF_IN1 and OFF_IN2 are simultaneously received, not only are pulses generated in both the main signals OFF1A and OFF2A, but pulses are also generated in both the sub-signals OFF1B and OFF2B. The sub-signal OFF2B is input to the NOR gates NOR1 and NOR2. Therefore, the set signal SET1 and the reset signal RST1 are maintained at low level. Also, the sub-signal OFF1B is input to the NOR gates NOR3 and NOR4. Therefore, the set signal SET2 and the reset signal RST2 are also maintained at low level.

Next, consider a case where the second logic 421 simultaneously receives the reception pulse signals ON_IN1 and OFF_IN2. In this case, as shown in the ninth row of this figure, pulses are generated in both the main signals ON1A and OFF2A. Therefore, the set signal SET4 rises to high level, so the latch output signal Q4 is set to high level. At this time, the second logic 421 switches from the PWM mode, in which it receives pulse driving signals (e.g., the reception pulse signals ON_IN1, OFF_IN1, ON_IN2, and OFF_IN2) via the transformers 431 to 434, to the SPI communication mode, in which it transmits and receives serial communication signals. On the other hand, when the serial communication end signal SC_END (=reset signal RST4) rises to high level, the latch output signal Q4 is reset to low level. At this time, the second logic 421 switches from the SPI communication mode to the PWM mode.

Note that when the reception pulse signals ON_IN1 and OFF_IN2 are simultaneously received, not only are pulses generated in both the main signals ON1A and OFF2A, but pulses are also generated in both the sub-signals ON1B and OFF2B. The sub-signal OFF2B is input to the NOR gates NOR1 and NOR2. Therefore, the set signal SET1 and the reset signal RST1 are maintained at low level. Also, the sub-signal ON1B is input to the NOR gates NOR3 and NOR4. Therefore, the set signal SET2 and the reset signal RST2 are also maintained at low level.

Finally, consider a case where the second logic 421 simultaneously receives the reception pulse signals ON_IN2 and OFF_IN1. In this case, as shown in the tenth row of this figure, pulses are generated in both the main signals ON2A and OFF1A. In this state, the set signals SET1 to SET4 and the reset signals RST1 to RST4 are all maintained at low level. Therefore, the output state and operation mode of the signal transmission device 400 do not change. However, the signal transmission device 400 may be configured to switch its output state or operation mode when the reception pulse signals ON_IN2 and OFF_IN1 are simultaneously received.

Summarizing the bold frames in FIG. 16, the transformers 431 and 433 are simultaneously pulse-driven when making the fifth output state (OUT1=OUT2=H). The transformers 432 and 434 are simultaneously pulse-driven when making the sixth output state (OUT1=OUT2=L). The transformers 431 and 434 (or the transformers 432 and 433 may also be used) are simultaneously pulse-driven when switching the operation mode from the PWM mode to the SPI communication mode.

In this way, with the signal transmission device 400 of the second embodiment, by simultaneously pulse-driving a plurality of transformers 431 to 434, it is possible to increase the output states of the signal transmission device 400 or switch the operation mode of the signal transmission device 400 without requiring the addition of transformers.

Note that the number of transformers integrated in the third chip 430 is not limited to four. The more transformers there are, the more combinations of transformers that can be pulse-driven simultaneously. Therefore, it is possible to increase the state transition patterns (output states or operation modes) of the signal transmission device 400.

Figure 17:
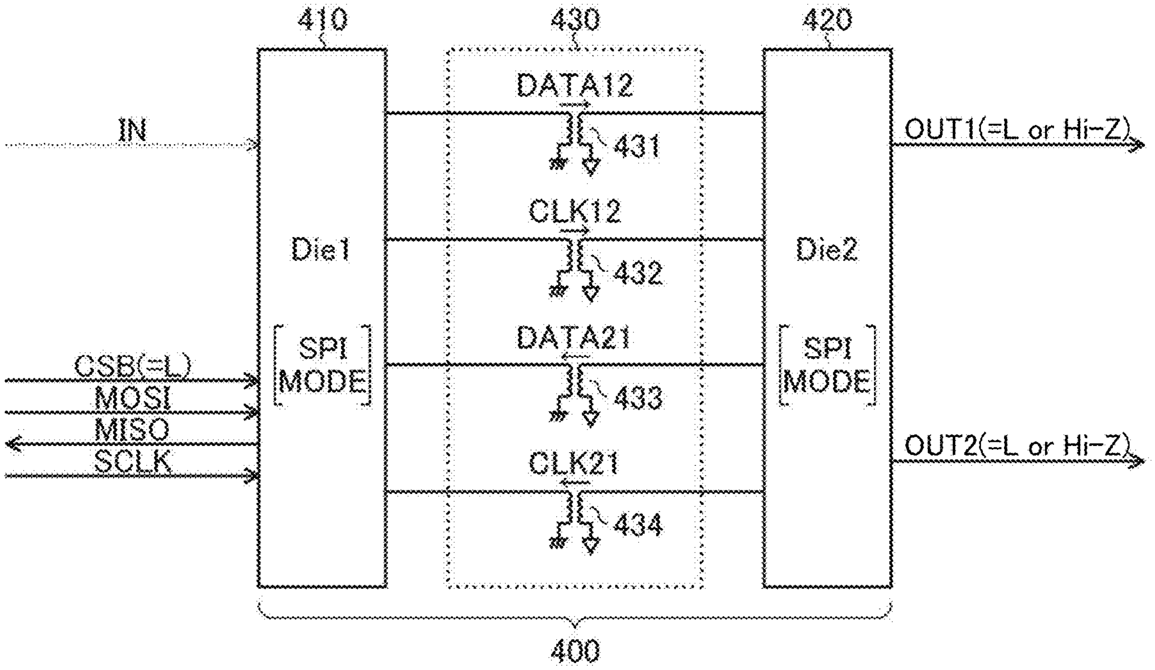
FIG. 17 is a diagram showing the SPI communication mode of the signal transmission device.

FIG. 17 is a diagram showing the SPI communication mode of the signal transmission device 400. When the signal transmission device 400 is in the SPI communication mode, a first data signal DATA12 is isolated and transmitted from the first chip 410 to the second chip 420 via the transformer 431. Also, a first clock signal CLK12 is isolated and transmitted from the first chip 410 to the second chip 420 via the transformer 432. The first data signal DATA1 may be operation parameters (detection threshold values or release threshold values for various protection functions) to be set in the second chip 420.

Also, when the signal transmission device 400 is in the SPI communication mode, a second data signal DATA21 is transmitted from the second chip 420 to the first chip 410 via the transformer 433. Also, a second clock signal CLK21 is transmitted from the second chip 420 to the first chip 410 via the transformer 434. The second data signal DATA2 may be operation parameters already set in the second chip 420.

In this way, with a configuration that shares the transformers 431 to 434 for both the PWM mode and the SPI communication mode, it is possible to implement a chip-to-chip serial communication function without increasing the isolation devices integrated in the third chip 430.

Note that when the signal transmission device 400 is in the SPI communication mode, the first output pulse signal OUT1 and the second output pulse signal OUT2 may both be at low level or in a high-impedance state. With this configuration, unintended driving of the switching device SW can be prevented.

<Application to Vehicles>

Figure 18:
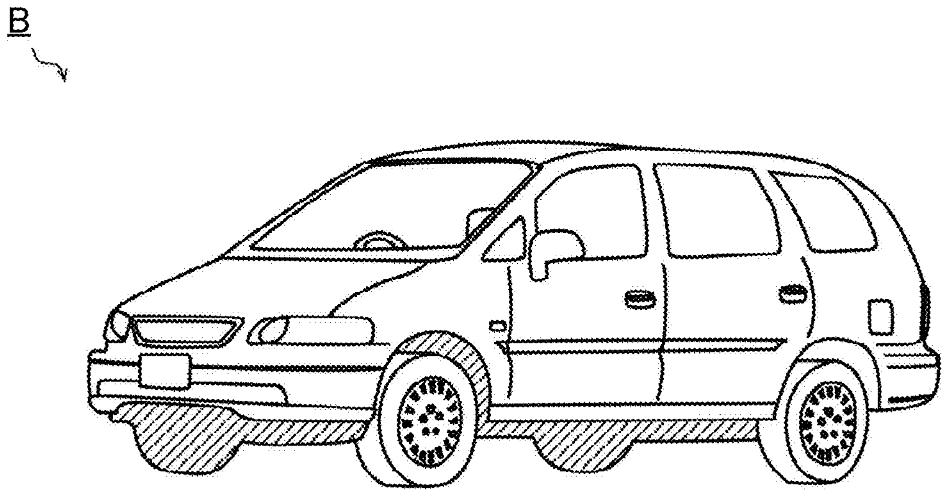
FIG. 18 is a diagram showing the exterior of a vehicle.

FIG. 18 is a diagram showing the exterior of a vehicle. The vehicle B of this configuration example is mounted with various electronic apparatuses that operate by receiving power supply from a battery.

The vehicle B includes not only engine vehicles but also electric vehicles (BEV [battery electric vehicle], HEV [hybrid electric vehicle], PHEV/PHV [plug-in hybrid electric vehicle/plug-in hybrid vehicle], or FCEV/FCV [fuel cell electric vehicle/fuel cell vehicle] such as xEVs).

Note that the signal transmission device 200 or 400 explained earlier can be incorporated into any of the electronic apparatuses mounted in the vehicle B.

<Addendum>

According to the present disclosure, isolation devices can be reduced. The above disclosure is supplemented below.

[Addendum 1]

A signal transmission device (400), comprising:
a first logic (411),
a second logic (421),
a plurality of isolation devices (431 to 434) configured to isolate and transmit a plurality of sets of first signals (ON_IN1/2) and second signals (OFF_IN1/2) between the first logic (411) and the second logic (421); and a plurality of output circuits (422, 423) configured to generate a plurality of output signals (OUT1/2) according to instructions from the second logic (421), wherein the first logic (411) is capable of simultaneously transmitting a plurality of combinations of signals from different sets among the plurality of sets of the first signals (ON_IN1/2) and the second signals (OFF_IN1/2), and the second logic (421) performs operations according to the combinations of signals received via the plurality of isolation devices (431 to 434) from among the plurality of sets of the first signals (ON_IN1/2) and the second signals (OFF_IN1/2).

[Addendum 2]

The signal transmission device (400) according to Addendum 1, wherein the plurality of sets of the first signals (ON_IN1/2) and the second signals (OFF_IN1/2) include a first set of ON signal (ON_IN1) and OFF signal (OFF_IN1), and a second set of ON signal (ON_IN2) and OFF signal (OFF_IN2), and the plurality of output circuits (422, 423) includes a first output circuit (422) configured to generate a first output signal (OUT1) according to instructions from the second logic (421), and a second output circuit (423) configured to generate a second output signal (OUT2) according to instructions from the second logic (421).

[Addendum 3]

The signal transmission device (400) according to Addendum 2, wherein the second logic (421) controls each of the first output circuit (422) and the second output circuit (423) to make both the first output signal (OUT1) and the second output signal (OUT2) at an ON-time logic level when simultaneously receiving the first set of ON signal (ON_IN1) and the second set of ON signal (ON_IN2), and to make both the first output signal (OUT1) and the second output signal (OUT2) at an OFF-time logic level when simultaneously receiving the first set of OFF signal (OFF_IN1) and the second set of OFF signal (OFF_IN2).

[Addendum 4]

The signal transmission device (400) according to Addendum 2 or 3, wherein the second logic (421) switches from a first mode, in which the second logic receives pulse driving signals via the plurality of isolation devices (431 to 434), to a second mode, in which the second logic transmits and receives serial communication signals, when simultaneously receiving the first set of ON signal (ON_IN1) and the second set of OFF signal (OFF_IN2) or when simultaneously receiving the first set of OFF signal (OFF_IN1) and the second set of ON signal (ON_IN2).

[Addendum 5]

The signal transmission device (400) according to Addendum 2 to 4, wherein the second logic (421) controls each of the first output circuit (422) and the second output circuit (423) to make the first output signal (OUT1) at an ON-time logic level and the second output signal (OUT2) in a high-impedance output state when receiving the first set of ON signal (ON_IN1) and not receiving any of the other signals (OFF_IN1, ON_IN2, OFF_IN2), to make the first output signal (OUT1) at an OFF-time logic level and the second output signal (OUT2) in a high-impedance output state when receiving the first set of OFF signal (OFF_IN1) and not receiving any of the other signals (ON_IN1, ON_IN2, OFF_IN2), to make the second output signal (OUT2) at an ON-time logic level and the first output signal (OUT1) in a high-impedance output state when receiving the second set of ON signal (ON_IN2) and not receiving any of the other signals (ON_IN1, OFF_IN1, OFF_IN2), and to make the second output signal (OUT2) at an OFF-time logic level and the first output signal (OUT1) in a high-impedance output state when receiving the second set of OFF signal (OFF_IN2) and not receiving any of the other signals (ON_IN1, OFF_IN1, ON_IN2).

[Addendum 6]

The signal transmission device (400) according to Addendum 2 to 5, wherein the second logic (421) includes:

a first delay circuit (DLY1) configured to generate a first main signal (ON1A) from the first set of ON signal (ON_IN1), a second delay circuit (DLY2) configured to generate a first sub-signal (ON1B) from the first set of ON signal (ON_IN1), a third delay circuit (DLY3) configured to generate a second main signal (OFF1A) from the first set of OFF signal (OFF_IN1), a fourth delay circuit (DLY4) configured to generate a second sub-signal (OFF1B) from the first set of OFF signal (OFF_IN1,;

a fifth delay circuit (DLY5) configured to generate a third main signal (ON2A) from the second set of ON signal (ON_IN2), a sixth delay circuit (DLY6) configured to generate a third sub-signal (ON2B) from the second set of ON signal (ON_IN2), a seventh delay circuit (DLY7) configured to generate a fourth main signal (OFF2A) from the second set of OFF signals (OFF_IN2); and an eighth delay circuit (DLY8) configured to generate a fourth sub-signal (OFF2B) from the second set of OFF signals (OFF_IN2).

[Addendum 7]

The signal transmission device (400) according to Addendum 6, wherein the second logic (421) includes:

a first logic gate (NOR1) configured to generate a first set signal (SET1) from the first main signal (ON1A), the second sub-signal (OFF1B), the third sub-signal (ON2B), and the fourth sub-signal (OFF2B), a second logic gate (NOR2) configured to generate a first reset signal (RST1) from the second main signal (OFF1A), the first sub-signal (ON1B), the third sub-signal (ON2B), and the fourth sub-signal (OFF2B), a third logic gate (NOR3) configured to generate a second set signal (SET2) from the third main signal (ON2A), the first sub-signal (ON1B), the second sub-signal (OFF1B), and the fourth sub-signal (OFF2B), a fourth logic gate (NOR4) configured to generate a second reset signal (RST2) from the fourth main signal (OFF2A), the first sub-signal (ON1B), the second sub-signal (OFF1B), and the third sub-signal (ON2B), a fifth logic gate (NOR5) configured to generate a third set signal (SET3) from the first main signal (ON1A) and the third main signal (ON2A), a sixth logic gate (NOR6) configured to generate a third reset signal (RST3) from the second main signal (OFF1A) and the fourth main signal (OFF2A); and a seventh logic gate (NOR7) configured to generate a fourth set signal (SET4) from the first main signal (ON1A) and the fourth main signal (OFF2A) or from the second main signal (OFF1A) and the third main signal (ON2A).

[Addendum 8]

The signal transmission device (400) according to Addendum 7, wherein the second logic (421) includes:

a first flip-flop (FF1) configured to make the first output signal (OUT1) at an ON-time logic level and the second output signal (OUT2) in a high-impedance output state in response to the first set signal (SET1), and to make the first output signal (OUT1) at an OFF-time logic level and the second output signal (OUT2) in a high-impedance output state in response to the first reset signal (RST1);

a second flip-flop (FF2) configured to make the second output signal (OUT2) at an ON-time logic level and the first output signal (OUT1) in a high-impedance output state in response to the second set signal (SET2), and to make the second output signal (OUT2) at an OFF-time logic level and the first output signal (OUT1) in a high-impedance output state in response to the second reset signal (RST2);

a third flip-flop (FF3) configured to make both the first output signal (OUT1) and the second output signal (OUT2) at an ON-time logic level in response to the third set signal (SET3), and to make both the first output signal (OUT1) and the second output signal (OUT2) at an OFF-time logic level in response to the third reset signal (RST3); and a fourth flip-flop (FF4) configured to switch the operation mode of the second logic (421) from a first mode, in which the second logic receives pulse driving signals via the plurality of isolation devices (431 to 434), to a second mode, in which the second logic transmits and receives serial communication signals, in response to the fourth set signal (SET4), and to switch the operation mode of the second logic (421) from the second mode to the first mode in response to a fourth reset signal (RST4).

[Addendum 9]

An electronic apparatus (A), comprising:

the signal transmission device (400) according to Addendum 1 to 8.

[Addendum 10]

A vehicle (B), comprising:

the electronic apparatus (A) according to Addendum 9.

<Others>

Various technical features disclosed in the present specification can be modified in various ways within the scope of their technical creation, in addition to the above embodiments. That is, the above embodiments should be considered exemplary in all respects and not restrictive. The technical scope of the present disclosure is defined by the claims and includes all changes within the meanings and ranges equivalent to the claims.

What is claimed is:

1. A signal transmission device, comprising:

a first logic, a second logic, a plurality of isolation devices configured to isolate and transmit a plurality of sets of first signals and second signals between the first logic and the second logic; and a plurality of output circuits configured to generate a plurality of output signals according to instructions from the second logic, wherein the first logic is capable of simultaneously transmitting a plurality of combinations of signals from different sets among the plurality of sets of the first signals and the second signals, and the second logic performs operations according to the combinations of signals received via the plurality of isolation devices from among the plurality of sets of the first signals and the second signals.

2. The signal transmission device according to claim 1, wherein the plurality of sets of the first signals and the second signals includes a first set of ON signal and OFF signal, and a second set of ON signal and OFF signal, and the plurality of output circuits includes a first output circuit configured to generate a first output signal according to instructions from the second logic, and a second output circuit configured to generate a second output signal according to instructions from the second logic.

3. The signal transmission device according to claim 2, wherein the second logic controls each of the first output circuit and the second output circuit to make both the first output signal and the second output signal at an ON-time logic level when simultaneously receiving the first set of ON signal and the second set of ON signal, and to make both the first output signal and the second output signal at an OFF-time logic level when simultaneously receiving the first set of OFF signal and the second set of OFF signal.

4. The signal transmission device according to claim 2, wherein the second logic switches from a first mode, in which the second logic receives pulse driving signals via the plurality of isolation devices, to a second mode, in which the second logic transmits and receives serial communication signals, when simultaneously receiving the first set of ON signal and the second set of OFF signal or when simultaneously receiving the first set of OFF signal and the second set of ON signal.

5. The signal transmission device according to claim 2, wherein the second logic controls each of the first output circuit and the second output circuit to make the first output signal at an ON-time logic level and the second output signal in a high-impedance output state when receiving the first set of ON signal and not receiving any of the other signals, to make the first output signal at an OFF-time logic level and the second output signal in a high-impedance output state when receiving the first set of OFF signal and not receiving any of the other signals, to make the second output signal at an ON-time logic level and the first output signal in a high-impedance output state when receiving the second set of ON signal and not receiving any of the other signals, and to make the second output signal at an OFF-time logic level and the first output signal in a high-impedance output state when receiving the second set of OFF signal and not receiving any of the other signals.

6. The signal transmission device according to claim 2, wherein the second logic includes:

a first delay circuit configured to generate a first main signal from the first set of ON signal;

a second delay circuit configured to generate a first sub-signal from the first set of ON signal;

a third delay circuit configured to generate a second main signal from the first set of OFF signal;

a fourth delay circuit configured to generate a second sub-signal from the first set of OFF signal;

a fifth delay circuit configured to generate a third main signal from the second set of ON signal;

a sixth delay circuit configured to generate a third sub-signal from the second set of ON signal;

a seventh delay circuit configured to generate a fourth main signal from the second set of OFF signal; and an eighth delay circuit configured to generate a fourth sub-signal from the second set of OFF signal.

7. The signal transmission device according to claim 6, wherein the second logic includes:

a first logic gate configured to generate a first set signal from the first main signal, the second sub-signal, the third sub-signal and the fourth sub-signal;

a second logic gate configured to generate a first reset signal from the second main signal, the first sub-signal, the third sub-signal and the fourth sub-signal;

a third logic gate configured to generate a second set signal from the third main signal, the first sub-signal, the second sub-signal and the fourth sub-signal;

a fourth logic gate configured to generate a second reset signal from the fourth main signal, the first sub-signal, the second sub-signal and the third sub-signal;

a fifth logic gate configured to generate a third set signal from the first main signal and the third main signal;

a sixth logic gate configured to generate a third reset signal from the second main signal and the fourth main signal; and a seventh logic gate configured to generate a fourth set signal from the first main signal and the fourth main signal or from the second main signal and the third main signal.

8. The signal transmission device according to claim 7, wherein the second logic includes:

a first flip-flop configured to make the first output signal at an ON-time logic level and the second output signal in a high-impedance output state in response to the first set signal, and to make the first output signal at an OFF-time logic level and the second output signal in a high-impedance output state in response to the first reset signal;

a second flip-flop configured to make the second output signal at an ON-time logic level and the first output signal in a high-impedance output state in response to the second set signal, and to make the second output signal at an OFF-time logic level and the first output signal in a high-impedance output state in response to the second reset signal;

a third flip-flop configured to make both the first output signal and the second output signal at an ON-time logic level in response to the third set signal, and to make both the first output signal and the second output signal at an OFF-time logic level in response to the third reset signal; and a fourth flip-flop configured to switch the operation mode of the second logic from a first mode, in which the second logic receives pulse driving signals via the plurality of isolation devices, to a second mode, in which the second logic transmits and receives serial communication signals, in response to the fourth set signal, and to switch the operation mode of the second logic from the second mode to the first mode in response to a fourth reset signal.

9. An electronic apparatus, comprising the signal transmission device according to claim 1.

10. A vehicle, comprising the electronic apparatus according to claim 9.

* * * * *